(12) United States Patent
Yamamura

(10) Patent No.: US 7,855,836 B2
(45) Date of Patent: Dec. 21, 2010

(54) LENS ARRAY, LED PRINT HEAD, EXPOSURE DEVICE, IMAGE FORMING APPARATUS, AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 5 days.

(21) Appl. No.: 12/453,527

(22) Filed: May 14, 2009

(65) Prior Publication Data

US 2009/0323191 A1    Dec. 31, 2009

(30) Foreign Application Priority Data

Jun. 27, 2008   (JP) .............................. 2008-169276

(51) Int. Cl.
G02B 27/10    (2006.01)
(52) U.S. Cl. ...................................... 359/619; 359/622
(58) Field of Classification Search ................. 359/619, 359/621, 622
See application file for complete search history.

(56) References Cited

U.S. PATENT DOCUMENTS 6,816,312 B2 * 11/2004 Oda et al. .................... 359/620

FOREIGN PATENT DOCUMENTS

| JP | 09-043538 | 2/1997 |
|---|---|---|
| JP | 2001-116905 | 4/2001 |
| JP | 2001-249274 | 9/2001 |
| JP | 2001-337205 | 12/2001 |
| JP | 2005-249826 | 9/2005 |
| JP | 2008-087185 | 4/2008 |
| JP | 2008-092006 | 4/2008 |

* cited by examiner

Primary Examiner—William C Choi
(74) Attorney, Agent, or Firm—Kubotera & Associates LLC

(57) ABSTRACT

A lens array includes a lens plate having a plurality of lenses arranged next to each other in a direction perpendicular to optical axes thereof, and a light blocking member for blocking light incident on the lenses. The light blocking member includes a light blocking portion and a plurality of light passing portions arranged at positions corresponding to the lenses. The light passing portions communicate with each other.

13 Claims, 25 Drawing Sheets

LENS ARRAY, LED PRINT HEAD, EXPOSURE DEVICE, IMAGE FORMING APPARATUS, AND READING APPARATUS

BACKGROUND OF THE INVENTION AND RELATED ART STATEMENT

The present invention relates to a lens array; an LED (Light Emitting Diode) head; an exposure device; an image forming apparatus; and a reading apparatus.

In a conventional image forming apparatus such as a printer and a copier, a conventional reading apparatus such as a scanner and a facsimile, or an image processing apparatus such as a multi-function product, a charge roller charges a surface of a photosensitive drum. Then, an LED (Light Emitting Diode) head as an exposure device exposes the photosensitive drum to form a static latent image thereon. A developing roller with toner attached thereto in a thin layer electrostatically attaches toner to the static latent image, thereby forming a toner image. Afterward, a transfer roller transfers the toner image to a sheet, and a fixing device fixes the toner image, thereby forming an image on the sheet.

In the LED head, a rod lens is provided for collecting light emitted from an LED element on the surface of the photosensitive drum. The rod lens is formed of a glass fiber with ions implanted thereto, so that a refractive index of the glass fiber decreases from a center portion thereof toward a circumferential portion thereof. A plurality of rod lenses is disposed to form a rod lens array, thereby constituting an optical system for forming an upright same-size image of an object in a linear arrangement.

Alternatively, a plurality of micro lenses is disposed to form a rod lens array, thereby constituting an optical system for forming an upright same-size image of an object in a linear arrangement (refer to Patent Reference).

Patent Reference: Japanese Patent Publication No. 2001-249274

A reading apparatus such as a scanner and a facsimile includes a rod lens array for forming an image of an original on a light receiving portion, in which a plurality of light receiving elements is arranged in an array arrangement.

In the conventional image forming apparatus, it is necessary to provide a light blocking plate as a light blocking member for preventing light from a micro lens other than a micro lens having an optical axis matched thereto. The light blocking plate includes a plurality of opening portions. When the micro lenses are arranged with a small interval, it is difficult to form the opening portions in the light blocking plate.

In view of the problems described above, an object of the present invention is to provide a lens array, an LED head, an exposure device, an image forming apparatus, and a reading apparatus capable of easily forming a light blocking member.

Further objects and advantages of the invention will be apparent from the following description of the invention.

SUMMARY OF THE INVENTION

In order to attain the objects described above, according to the present invention, a lens array includes a lens plate having a plurality of lenses arranged next to each other in a direction perpendicular to optical axes thereof, and a light blocking member for blocking light incident on the lenses. The light blocking member includes a light blocking portion and a plurality of light passing portions arranged at positions corresponding to the lenses. The light passing portions communicate with each other.

In the present invention, the lens array includes the lens plate having a plurality of the lenses arranged next to each other in the direction perpendicular to the optical axes thereof, and the light blocking member for blocking light incident on the lenses. The light blocking member includes the light blocking portion and the plurality of light passing portions arranged at the positions corresponding to the lenses. The light passing portions communicate with each other.

In particular, the light passing portions communicate with each other. Accordingly, it is possible to integrally form protrusions corresponding to the light passing portions on a metal mold. As a result, it is possible to easily produce the light blocking member, and to increase a lifetime and productivity of the metal mold.

DETAILED DESCRIPTION OF PREFERRED EMBODIMENTS

Hereunder, preferred embodiments of the present invention will be explained with reference to the accompanying drawings.

First Embodiment

Figure 2:
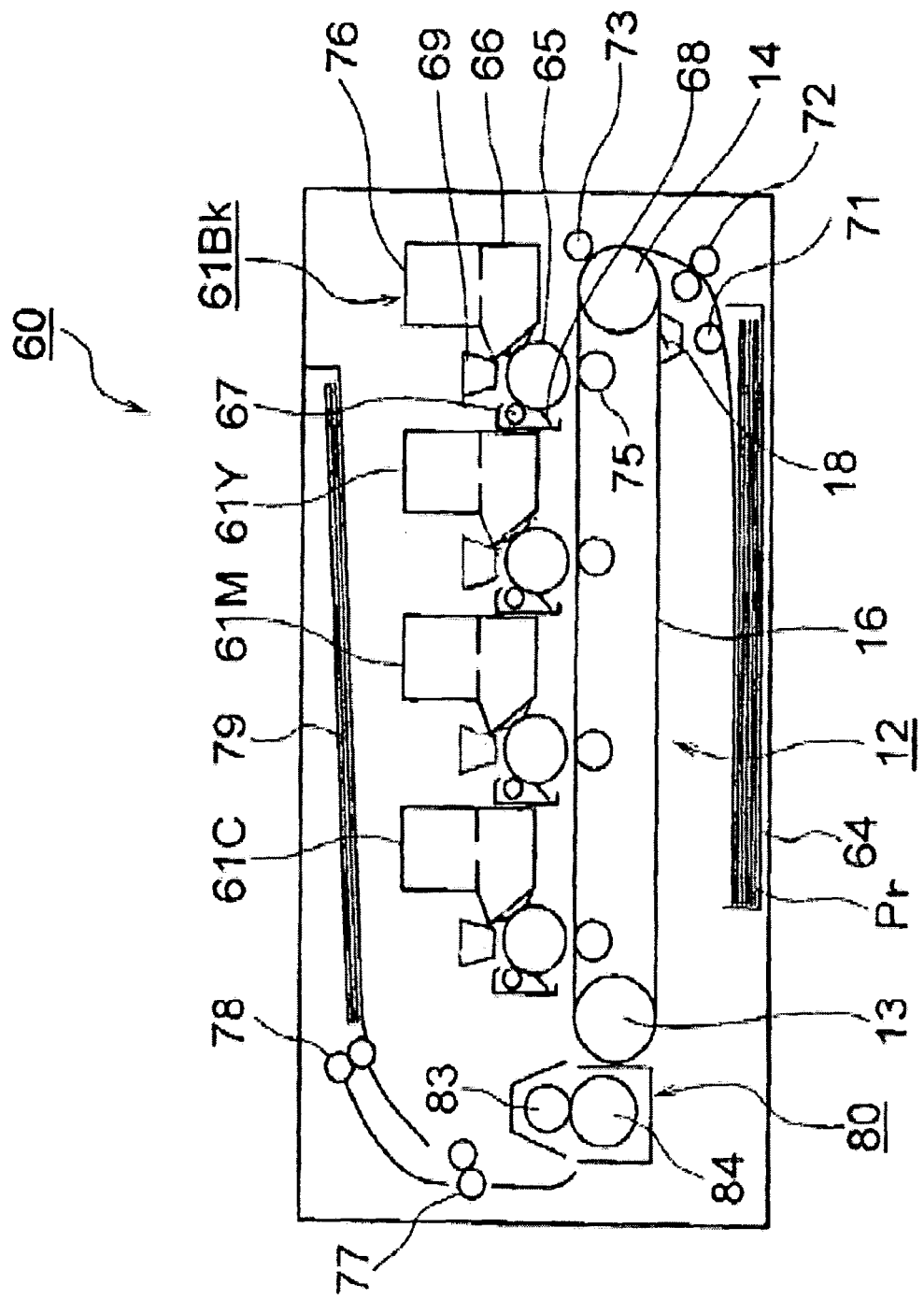
FIG. 2 is a schematic sectional view showing a configuration of a printer according to the first embodiment of the present invention.

A first embodiment of the present invention will be explained. First, a printer 60 as an image forming apparatus will be explained. FIG. 2 is a schematic sectional view showing a configuration of the printer 60 according to the first embodiment of the present invention.

As shown in FIG. 2, the printer 60 includes image forming units 61K, 61Y, 61M, and 61C for forming toner images as developer images in colors such as black, yellow, magenta, and cyan according to image data; and a transfer unit 12 disposed to face the image forming units 61K, 61Y, 61M, and 61C for forming transfer areas of colors with respect to the image forming units 61K, 61Y, 61M, and 61C, so that the toner images in colors are transferred to a sheet Pr as a medium.

In the embodiment, the printer 60 further includes a sheet supply cassette 64 as a medium storage unit; a sheet supply roller 71 as a medium supply roller for picking up the sheet Pr from the sheet supply cassette 64 one by one and supplying the sheet Pr to the transfer areas; a register roller 72 for supplying the sheet Pr thus supplied from the sheet supply cassette 64 to the transfer areas according to timings when the image forming units 61K, 61Y, 61M, and 61C form the toner images; transport rollers 73 and 77 for transporting the sheet Pr; a discharge roller 78 for discharging the sheet Pr to a discharge portion 79; and a fixing device 80 as a fixing unit for fixing a color toner image to the sheet Pr after the toner images are transferred in the transfer areas.

In the embodiment, the transfer unit 12 is connected to a motor (not shown) as a transfer drive unit. Further, the transfer unit 12 includes a drive roller 13 as a first roller rotating when the motor rotates; an idle roller 14 as a second roller rotating together with a rotation of the drive roller 13; an endless belt 16 as a transfer belt extending and moving with the drive roller 13 and the idle roller 14; transfer rollers 75 disposed inside the endless belt 16 to be freely rotatable and face photosensitive drums 65 as image supporting members disposed in the image forming units 61K, 61Y, 61M, and 61C; and a cleaning blade 18 as a first cleaning member disposed near the idle roller 14 to abut against an outer circumferential surface of the endless belt 16.

In the embodiment, the image forming units 61K, 61Y, 61M, and 61C have an identical configuration. More specifically, each of the image forming units 61K, 61Y, 61M, and 61C includes the photosensitive drum 65 to be freely rotatable; a charging roller 67 as a charging device; a developing device 66; a toner cartridge 76 as a developer cartridge for supplying toner as developer formed of a resin containing a colorant as a coloring agent; and a cleaning blade 68 as a second cleaning member.

In the embodiment, an LED head 69 as an exposure device or an LED print head is disposed between the charging roller 67 and the developing device 66 to face the photosensitive drum 65 for exposing a surface of the photosensitive drum 65. The fixing device 80 includes a heating roller 83 as a first roller and a pressing roller 84 as a second roller.

In the embodiment, a motor (not shown) as a drive unit is provided for driving the endless belt 16, the photosensitive drum 65, and the likes to move or rotate through a gear (not shown) as a drive transmission unit. A power source (not shown) is connected to the charging roller 67, the developing device 66, the LED head 69, the fixing device 80, and the likes. The printer 60 further includes an external interface (not shown) for communicating with a host device (not shown) and receiving print data and a control unit (not shown) for receiving the print data from the external interface and controlling an entire operation of the printer 60.

An operation of the printer 60 will be explained next. When a power source (not shown) applies a voltage to the charging rollers 67, the charging rollers 67 uniformly charge the surfaces of the photosensitive drums 65. When the photosensitive drum 65 rotate and the surfaces of the photosensitive drums 65 thus charged reach positions facing the LED heads 69, the LED heads 69 expose the surfaces of the photosensitive drums 65, thereby forming static latent images thereon. The developing devices develop the static latent images, thereby forming the toner images on the surfaces of the photosensitive drums 65.

When the sheet supply roller 71 picks up and supplies the sheet Pr placed in the sheet supply cassette 64, the register roller 72 and the transport roller 73 transport the sheet Pr to the transfer rollers 75 and the endless belt 16. While the photosensitive drums 65 are rotating, when the toner images formed on the surfaces of the photosensitive drums 65 reach positions facing the transfer rollers 75 and the endless belt 16, the transfer rollers 75 and the endless belt 16 with a voltage applied thereto from a power source (not shown) transfer the toner images formed on the surfaces of the photosensitive drums 65 to the sheet Pr.

In the next step, after the toner images are transferred to the sheet Pr, the sheet Pr is transported to the fixing device 80 while the endless belt 16 is moving. The fixing device 80 presses and heats the toner images on the sheet Pr to melt, thereby fixing the toner images to the sheet Pr. Further, the transport roller 77 and the discharge roller 78 discharge the sheet Pr to the discharge portion 79, thereby completing the operation of the printer 60.

Figure 3:
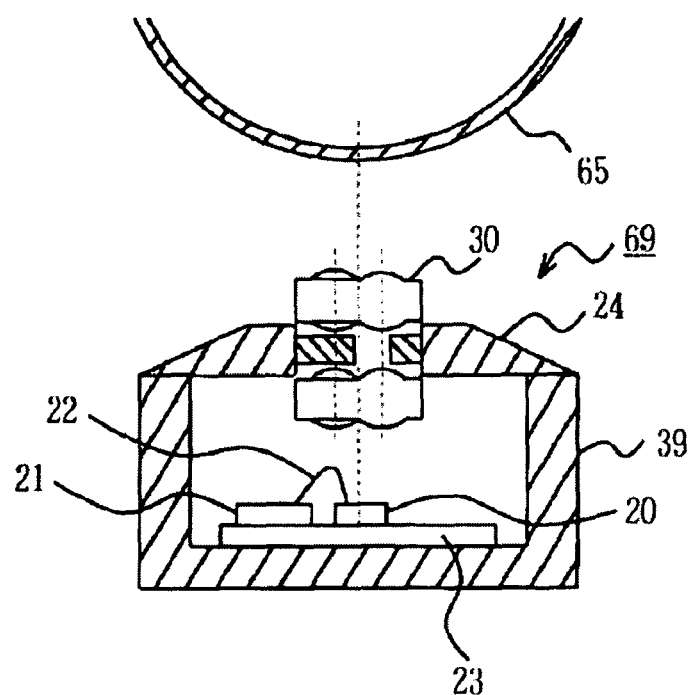
FIG. 3 is a schematic sectional view showing an LED (Light Emitting Diode) head according to the first embodiment of the present invention.

A configuration of the LED head 69 will be explained next. FIG. 3 is a schematic sectional view showing the LED (Light Emitting Diode) head 69 according to the first embodiment of the present invention.

As shown, in FIG. 3, the LED head 69 is provided with a lens array 30. The lens array 30 is fixed to a housing 39 of the LED head 69 with a holder 24. An LED elements 20 as a light emitting portion and a driver IC 21 for controlling the LED element 20 are arranged in the LED head 69. The LED head 69 is arranged to face the photosensitive drum 65 for forming the static latent image thereon. The LED element 20 and the driver IC 21 are arranged on a circuit board 23, and are connected to each other through a wiring portion 22. Note that a plurality of LED elements 20 constitutes an LED array.

In the embodiment, when the control unit generates a control signal according to image data, the control unit sends the control signal to the LED head 69. Accordingly, the driver IC 21 drives the LED elements 20 to emit light. When light emitted from the LED elements 20 passes through the lens array 30, exposure images of the LED elements 20 are formed on the photosensitive drum 65.

Figure 4:
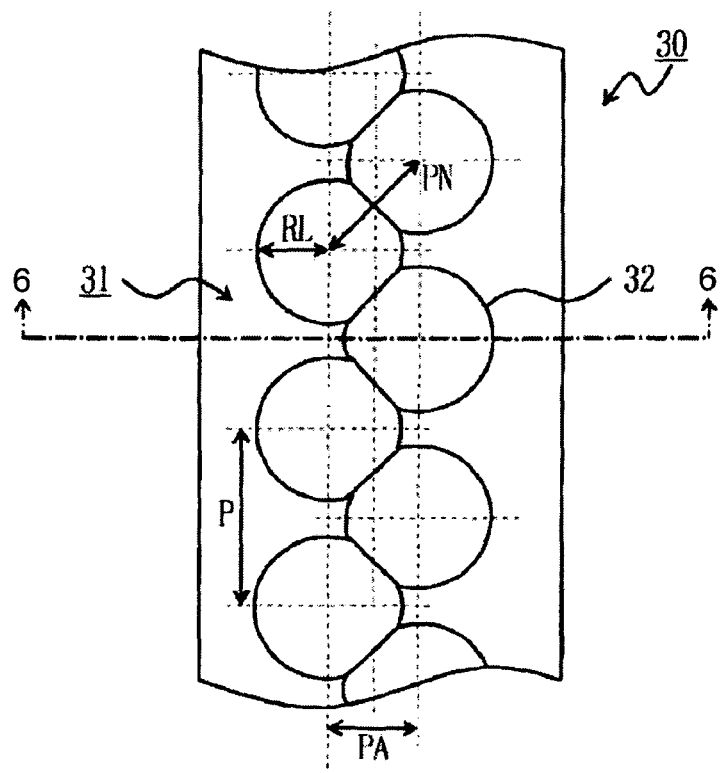
FIG. 4 is a schematic plan view showing a lens array according to the first embodiment of the present invention.
Figure 5:
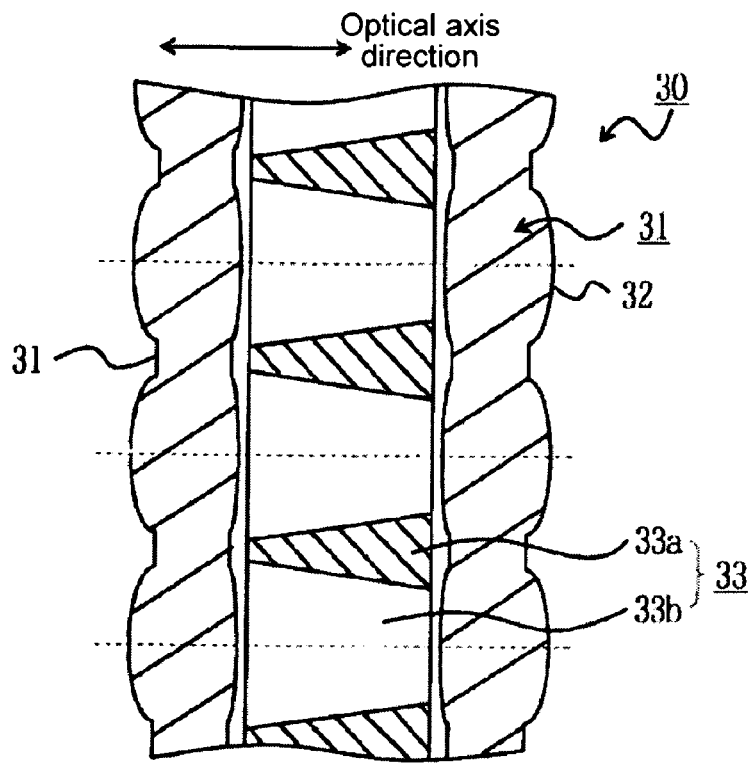
FIG. 5 is a schematic sectional view showing the lens array according to the first embodiment of the present invention.
Figure 6:
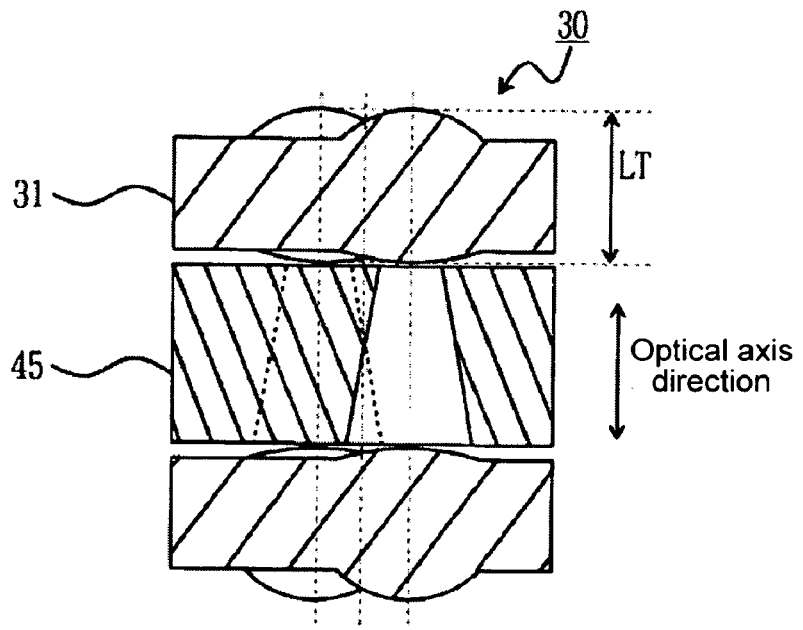
FIG. 6 is a schematic sectional view showing the lens array taken along a line 6-6 in FIG. 4 according to the first embodiment of the present invention.

A configuration of the lens array 30 of the LED head 69 will be explained next. FIG. 4 is a schematic plan view showing the lens array 30 according to the first embodiment of the present invention. FIG. 5 is a schematic sectional view showing the lens array 30 according to the first embodiment of the present invention. FIG. 6 is a schematic sectional view showing the lens array 30 taken along a line 6-6 in FIG. 4 according to the first embodiment of the present invention.

As shown in FIG. 6, the lens array 30 includes two lens plates 31 with a plurality of micro lenses 32 as lenses with a specific curved surface formed therein, and an aperture plate 33 as a light blocking member disposed between the lens plates 31.

As shown in FIG. 4, the micro lenses 32 are arranged on the lens plate 31 in two rows and a houndstooth check pattern in a direction perpendicular to optical axes thereof. Further, the micro lenses 32 are arranged such that a part of one micro lens 32 is overlapped with an adjacent micro lens 32.

In the lens plate 31, the micro lenses 32 are arranged in the two rows in a longitudinal direction of the lens plate 31, so that centers of the micro lenses 32 in each row are apart by a distance or an arrangement direction micro lens interval P, centers of the micro lenses 32 adjacent to each other are apart by a distance or an adjacent micro lens interval PN, and centers of the micro lenses 32 in a width direction of the lens plate 31 are apart by a distance or a lens row width direction between center distance PA. Each of the micro lenses 32 has a radius or a micro lens radius RL, and the lens plates 31 have a thickness or a lens thickness LT. The lens plates 31 are formed of a material transparent with respect to light emitted from the LED elements 20.

As shown in FIG. 5, the aperture plate 33 includes a light blocking portion 33a and light transmission portions 33b corresponding to the micro lenses 32. The light blocking portions 33a have an arc shaped portion having a size increasing from the LED elements 20 toward the photosensitive drum 65, and centerlines aligned with the micro lenses 32 of the lens plates 31.

In the embodiment, in the lens array 30, two lens groups formed of the micro lenses 32 are arranged in two rows in the direction perpendicular to the optical axes thereof such that the optical axes thereof are aligned with each other. Each of the micro lenses 32 forms an inverted reduced image, and the lens group forms an upright same-size image.

In the embodiment, the lens plates 31 of the lens array 30 are formed of, for example, an optical resin of a cyclo-olefin type (ZEONEX E48R, a product of ZEON CORPORATION). It is possible to integrally produce a plurality of the micro lenses 32 through injection molding. As an example, the lens plates 31 may be formed such that the arrangement direction micro lens interval P is 1.2 mm, the adjacent micro lens interval PN is 0.721 mm, the lens row width direction between center distance PA is 0.4 mm, the micro lens radius RL is 0.5 mm, and the lens thickness LT is 1.0 mm. The lens thickness LT represents a thickness of the micro lenses 31 in the optical axis direction thereof.

Figure 1:
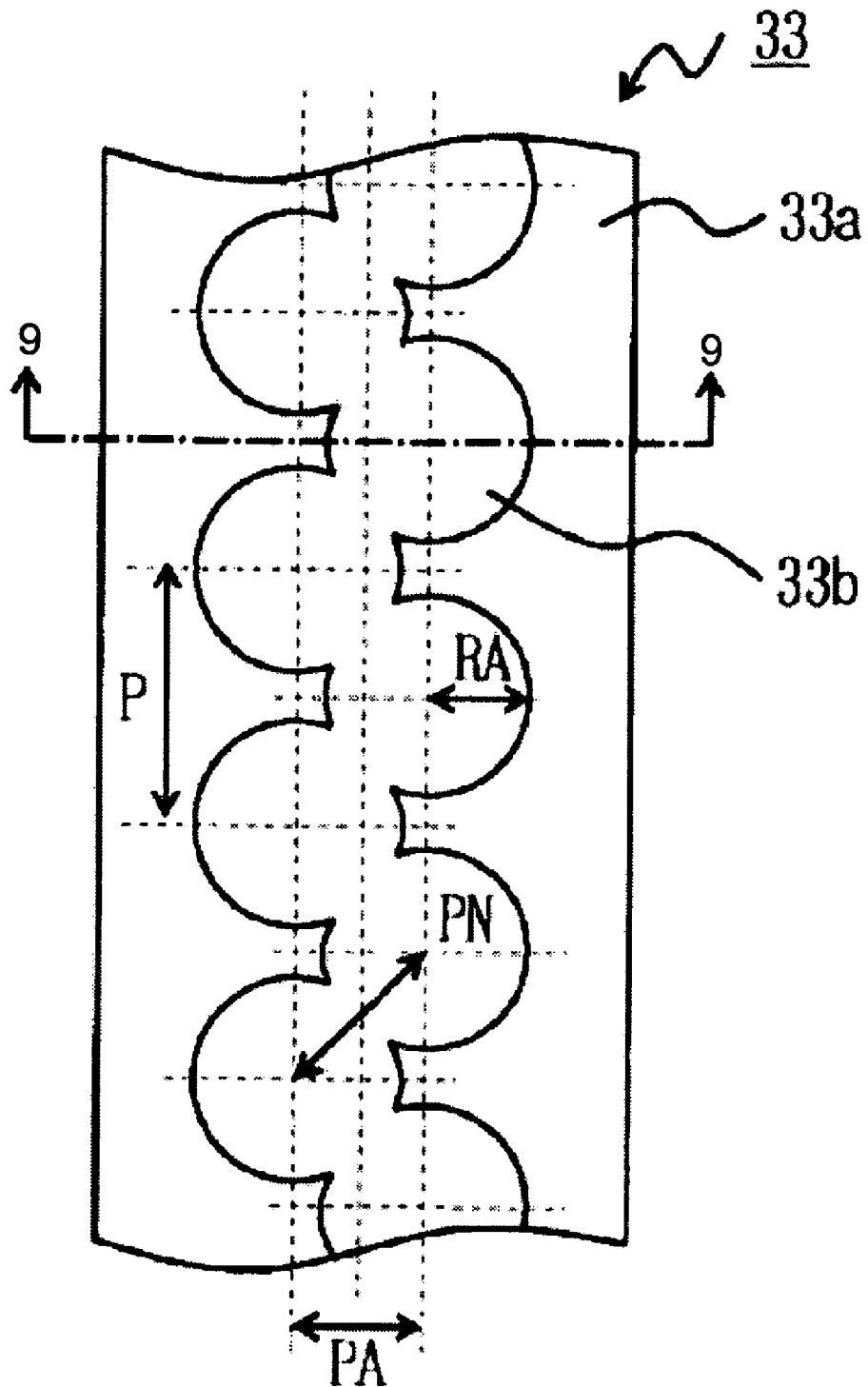
FIG. 1 is a schematic plan view showing an aperture plate according to a first embodiment of the present invention.
Figure 7:
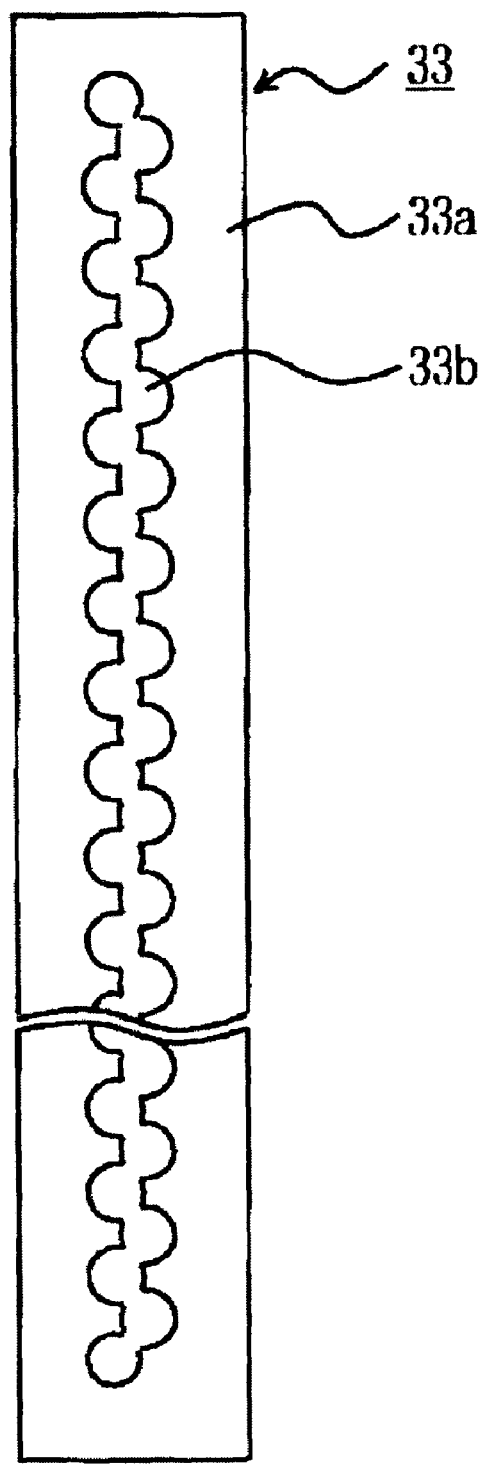
FIG. 7 is a schematic plan view showing the aperture plate according to the first embodiment of the present invention.
Figure 8:
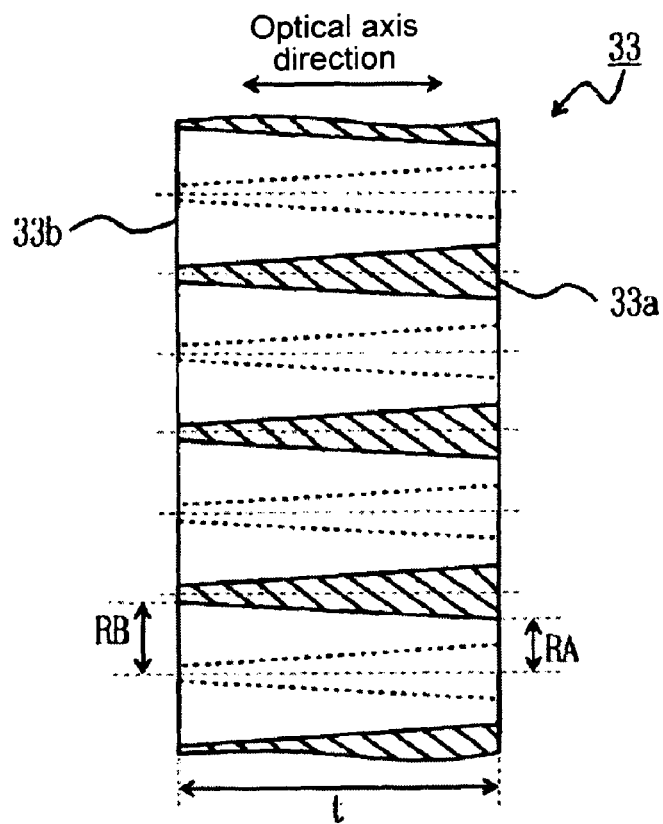
FIG. 8 is a schematic sectional view showing the aperture plate according to the first embodiment of the present invention.
Figure 9:
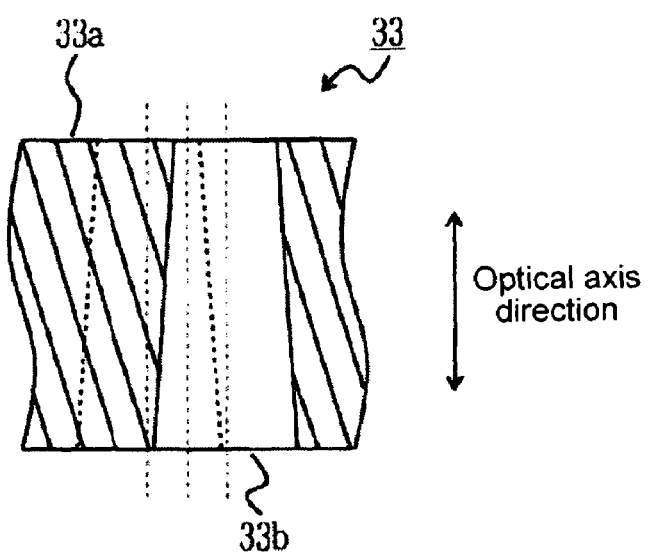
FIG. 9 is a schematic sectional view showing the aperture plate taken along a line 9-9 in FIG. 1 according to the first embodiment of the present invention.

A configuration of the aperture plate 33 will be explained in more detail. FIG. 1 is a schematic plan view showing the aperture plate 33 according to the first embodiment of the present invention. FIG. 7 is a schematic plan view showing the aperture plate 33 according to the first embodiment of the present invention. FIG. 8 is a schematic sectional view showing the aperture plate 33 according to the first embodiment of the present invention. FIG. 9 is a schematic sectional view showing the aperture plate 33 taken along a line 9-9 in FIG. 1 according to the first embodiment of the present invention.

As shown in FIGS. 1 and 7, the aperture plate 33 includes the light blocking portion 33a for blocking light incident from a lens except a lens with a matched optical axis, and the light transmission portions 33b for passing through light incident from the LED elements 23 (refer to FIG. 3). The light transmission portions 33b are arranged corresponding to the micro lenses 32 in tow rows and a houndstooth check pattern. Further, the light transmission portions 33b are arranged such that a part of one light transmission portion 33b is overlapped with an adjacent light transmission portion 33b. The light blocking portion 33a is formed of a material blocking light incident from the LED elements 20, and the light transmission portions 33b are formed of through holes.

In the embodiment, centers of the light transmission portions 33b in each row in the longitudinal direction of the aperture plate 33 are apart by a distance equal to the arrangement direction micro lens interval P. Centers of the light transmission portions 33b arranged adjacent to each other are apart by a distance equal to the adjacent micro lens interval PN. Centers of the light transmission portions 33b arranged in the width direction of the aperture plate 33 are apart by a distance equal to the lens row width direction between center distance PA.

As shown in FIG. 8, the light transmission portions 33b have a radius RA at one end portion thereof in the optical axis direction of the lens array 30, i.e., on a side of the LED elements 20. Further, the light transmission portions 33b have a radius RB at the other end portion thereof in the optical axis direction of the lens array 30, i.e., on a side of the photosensitive drum 65. The radius RB is greater than the radius RA (RB>RA). In the embodiment, the radius RA is set to 0.45 mm, and the radius RB is set to 0.5 mm. Further, the aperture plate 33 has an aperture plate thickness t of 2.5 mm.

In the embodiment, the aperture plate 33 is formed of a resin such as polycarbonate through injection molding. A metal mold for forming the aperture plate 33 is provided with protrusions having a shape corresponding to that of the light transmission portions 33b. As described above, the light transmission portions 33b are arranged such that a part of the light transmission portion 33b is overlapped and communicates with the light transmission portion 33b arranged adjacent thereto. Accordingly, the protrusions are integrally provided on the metal mold corresponding to the light transmission portions 33b communicating with each other.

As described above, the aperture plate 33 is formed through injection molding. Alternatively, a light blocking pattern may be formed of a material blocking light, so that the light blocking pattern is disposed in a light transmitting member, thereby obtaining the aperture plate 33.

When the light transmission portions 33b are arranged separately in an arrangement pattern with an interval the same as the arrangement direction micro lens interval P, it is necessary to provide pins on the metal mold as inserts having a shape corresponding to that of the light transmission portions 33b. In this case, when the aperture plate 33 of the lens array 30 is formed corresponding to a width (210 mm) of the sheet Pr with the A4 size, in which the light transmission portions 33b are arranged with an interval the same as the arrangement direction micro lens interval P, it is necessary to provide 350 pins in a metal mold corresponding to about 350 of the through holes. Each of the pins needs to have a length of 2.5 mm, i.e., the aperture plate thickness t. Accordingly, it is difficult to produce the metal mold.

Further, when the light transmission portions 33b have a radius of about 0.4 mm, the pins provided in the metal mold need to have a radius of 0.4 mm. Accordingly, the pins tend to be damaged, thereby lowering durability of the metal mold. When a specific pin is damaged, it is necessary to replace all of the pins, thereby lowering productivity of the metal mold.

In the embodiment, the light transmission portions 33b communicate with each other, so that the protrusions are integrated with each other in the metal mold, thereby making it possible to improve durability and productivity of the metal mold. Further, the light transmission portions 33b have the radius RA at one end portion thereof on the side of the LED elements 20 smaller than the radius RB at the other end portion thereof on the side of the photosensitive drum 65. Accordingly, the light transmission portions 33b have one end portions on the side of the LED elements 20 smaller than the other end portions on the side of the photosensitive drum 65. As a result, when the aperture plate 33 is removed from the metal mold in the right direction shown in FIG. 8 after injection molding, it is possible to reduce friction between a surface of the light blocking portion 33a and surfaces of the protrusions. Accordingly, when the aperture plate 33 is removed from the metal mold, it is possible to prevent the aperture plate 33 from being damaged, thereby improving a yield of the aperture plate 33.

Figure 10:
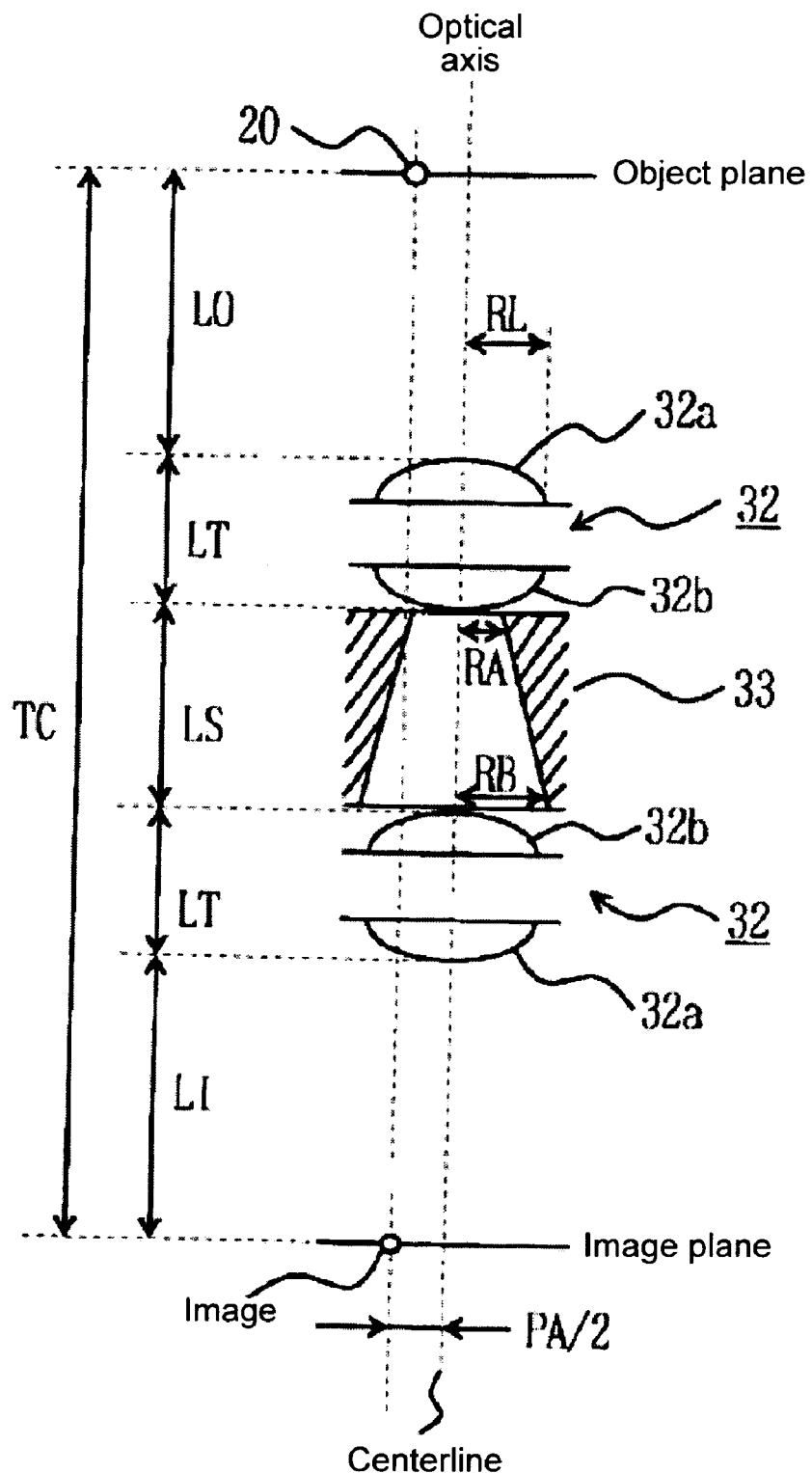
FIG. 10 is a schematic view showing the lens array in an arranged state according to the first embodiment of the present invention.

An optical system of the lens array 30 will be explained next. FIG. 10 is a schematic view showing the lens array 30 in an arranged state according to the first embodiment of the present invention. A specification of the lens array 30 is shown in Table shown below.

TABLE

| Symbol | Description | Value |
| --- | --- | --- |
| P | Arrangement direction micro lens interval (mm) | 1.200 |
| PN | Adjacent micro lens interval (mm) | 0.721 |
| PA | Lens row width direction between center distance (mm) | 0.400 |
| LO | Object plane lens plane distance (mm) | 2.300 |
| RL | Micro lens radius (mm) | 0.500 |
| CO | Outer curved surface curvature radius (mm) | 0.8645 |
| AO | Outer curved surface fourth aspheric coefficient | −0.3845 |
| BO | Outer curved surface sixth aspheric coefficient | −0.2100 |
| CI | Inner curved surface curvature radius (mm) | −0.8908 |
| AI | Inner curved surface fourth aspheric coefficient | 0.4542 |
| BI | Inner curved surface sixth aspheric coefficient | −0.0753 |
| LT | Lens thickness (mm) | 1.000 |
| LS | Lens surface distance (mm) | 2.540 |
| RA | Radius (mm) | 0.450 |
| RB | Radius (mm) | 0.500 |
| t | Aperture plate thickness (mm) | 2.500 |
| LI | Image plane lens plane distance (mm) | 2.300 |
| TC | Image plane object plane distance (mm) | 9.140 |

In Table, P is the arrangement direction micro lens interval; ON is the adjacent micro lens interval; and PA is the lens row width direction between center distance. LO is the object plane lens plane between a plane representing the object plane where the LED elements 20 are arranged and top portions of outer curved surfaces 32a of the micro lenses 32; and RL is the micro lens radius.

Further, in Table, CO is an outer curved surface curvature radius representing a curvature radius of the outer curved surfaces 32a of the micro lenses 32; AO is an outer curved surface fourth aspheric coefficient representing a fourth aspheric coefficient of the outer curved surfaces 32a; and BO is an outer curved surface sixth aspheric coefficient representing a sixth aspheric coefficient of the outer curved surfaces 32a. CI is an inner curved surface curvature radius representing a curvature radius of inner curved surfaces 32b of the micro lenses 32; AI is an inner curved surface fourth aspheric coefficient representing a fourth aspheric coefficient of the inner curved surfaces 32b; and BI is an inner curved surface sixth aspheric coefficient representing a sixth aspheric coefficient of the inner curved surfaces 32b.

Further, in Table, LT is the lens thickness; LS is a lens surface distance representing a distance between the inner curved surfaces 32b; RA is the radius of the end portions of the light transmission portions 33b on the side of the LED elements 20; RB is the radius of the other end portions of the light transmission portions 33b on the side of the photosensitive drum 65; t is the aperture plate thickness; LI is an image plane lens plane distance between the surface of the photosensitive drum 65 representing the image plane where the exposure image is formed and the top portions of the outer curved surfaces 32a of the micro lenses 32; and TC is an image plane object plane distance representing a distance between the image plane and the object plane.

In the embodiment, the light transmission portions 33b are arranged in the aperture plate 33 such that the radius RA on the side of the LED elements 20 is greater than the radius RB on the side of the photosensitive drum 65. Accordingly, inner circumferential surfaces of the light transmission portions 33b are inclined with respect to the optical axes. When the LED elements 20 emit light, light does not completely incident on the inner circumferential surfaces of the light transmission portions 33b, thereby preventing reflection on the inner circumferential surfaces.

In the embodiment, each of the micro lenses 32 has the curved surface formed in a rotationally symmetrical high order aspheric surface expressed with the following equation:

$$z(r) = \frac{\frac{r^2}{C}}{1 + \sqrt{1 - \left(\frac{r}{C}\right)^2}} + Ar^4 + Br^6$$

In the embodiment, the rotationally symmetrical high order aspheric surface has an identical shape extending from the optical axis of the micro lens 32 in a radial direction thereof (rotational symmetry), and has a curved shape with a plurality of inflection points. The function z(r) represents a rotational coordinate with a direction in parallel to the optical axis of the micro lens 32 as a rotational axis and a coordinate r along the radial direction. The top portion of the curved surface of each of the micro lenses 39 represents an origin. A positive number is assigned along a direction from the object plane of the lens array 30 toward the image plane. Further, C is the curvature radius of the micro lenses 39, and A and B are the fourth aspheric coefficient and the sixth aspheric coefficient of the rotationally symmetrical high order aspheric surface, respectively As described above, in the embodiment, a plurality of the micro lenses 32 is formed in the lens plate 31. Alternatively, the micro lenses 32 may be formed separately, and are fixed to the lens plate 31 with the arrangement direction micro lens interval P in between.

As described above, in the embodiment, the outer curved surfaces 32a and the inner curved surfaces 32b of the micro lenses 32 are formed in the rotationally symmetrical high order aspheric surface. Alternatively, the outer curved surfaces 32a and the inner curved surfaces 32b may be formed in a spherical surface. Further, the outer curved surfaces 32a and the inner curved surfaces 32b may be formed in a Korenich surface such as a parabolic surface, an oval surface, a hyperbolic surface; a toroid surface or a cylinder surface asymmetrical in directions perpendicular to the optical axis; and a well-known free curved surface.

As described above, in the embodiment, the micro lenses 32 are arranged in the two rows and the houndstooth check pattern. Alternatively, the micro lenses 32 may be arranged in one row or a plurality of rows such as three rows. Each of the micro lenses 32 is formed of the single lens having the two refractive surfaces (curved surfaces). Alternatively, each of the micro lenses 32 may be formed of a combination lens of a plurality of combined single lenses having more than four refractive surfaces.

As described above, in the embodiment, the micro lenses 32 are formed of the transparent material having a uniform refractive index through which light of the LED elements 20 passes. Alternatively, the micro lenses 32 may be formed of a refractive index distribution type lens having a specific refractive index, an optical fiber, and the likes.

As described above, in the embodiment, the light transmission portions 33b have the sectional shape taken along the direction perpendicular to the optical axes, in which the adjacent circles are overlapped. Alternatively, the light transmission portions 33b may have a sectional shape in which rectangle shapes or polygonal shapes are overlapped.

As described above, in the embodiment, the aperture plate 33 is formed of polycarbonate through injection molding, and may be formed of another type of resin. Further, the aperture plate 33 may be formed through a process such as a machining process, an etching process, and the likes.

As described above, in the embodiment, the aperture plate 33 is disposed between the lens plates 31, and may be disposed between the lens plate 31 and the LED elements 20, or between the lens plate 31 and the photosensitive drum 65.

As described above, in the embodiment, the LED elements 20 are provided as the light emitting portions. Alternatively, an organic EL (Electro Luminescence) or a semiconductor laser may be provided. Further, it is possible to use an exposure device provided with a light source such as a fluorescent lamp and a halogen lamp, and a shutter formed of a liquid crystal element.

It is possible to use the lens array 30 in the embodiment in a lighting device for irradiating light on a specific location; an ultraviolet irradiation device for irradiating ultraviolet rays on a specific location; or a backlight unit of an LCD (Liquid Crystal Display). Further, the lens array 30 in the embodiment may be used in an optical system of a liquid crystal projector, or an optical system of a light switch type projector having a DMD (Digital Micro Mirror Device).

Figure 11:
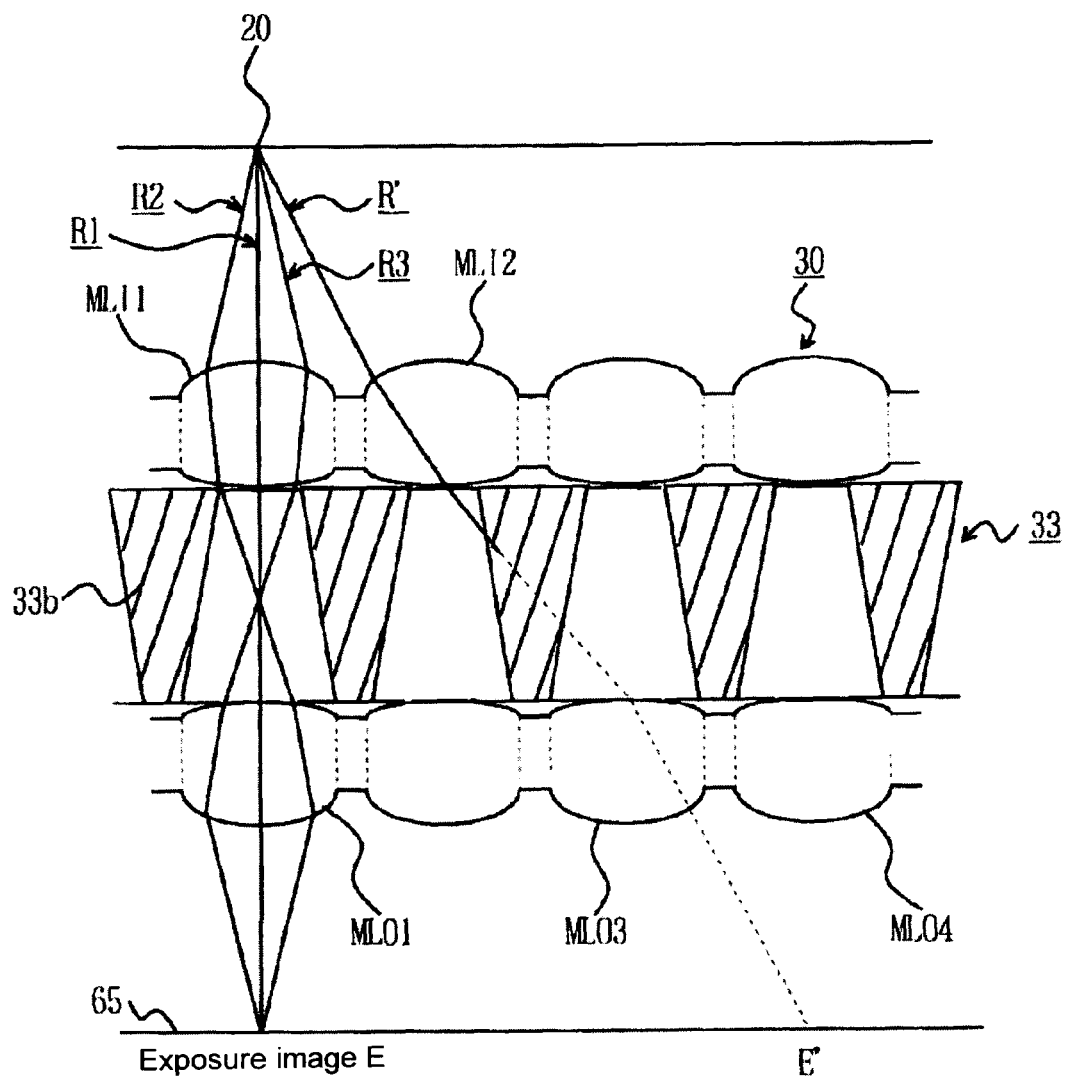
FIG. 11 is a schematic view showing an optical system of the lens array according to the first embodiment of the present invention.

An operation of the lens array 30 will be explained next. FIG. 11 is a schematic view showing an optical system of the lens array 30 according to the first embodiment of the present invention.

As shown in FIG. 11, the optical system of the lens array 30 includes the LED element 20; specific micro lenses MLI1, MLI2, MLO1, MLO3, and MLO4 among the micro lenses 32; the lens array 30, the aperture plate 33; and the photosensitive drum 65. E represents an exposure image of the LED element 20.

Among light paths between the LED element 20 and the exposure image E formed with the lens array 30, a main ray R1 passes through a shortest route, and peripheral rays R2 and R3 pass through outermost routes of each of the micro lenses ML11, ML12, MLO1, MLO3, and MLO4.

In the optical system, light incident on the micro lens MLI1 situated closest to the LED element 20 is collected in the light transmission portion 33b of the aperture plate 33 once. Afterward, light is incident on the micro lens MLO1, thereby forming the exposure image E. On the other hand, light incident on the micro lens MLI2 situated adjacent to the micro lens MLI1 is blocked with the aperture plate 33. Accordingly, light does not reach the photosensitive drum 65, thereby not forming the exposure image E'.

With respect to the LED head 69 in the embodiment, when MTF (Modulation Transfer Function) representing a resolution of the exposure image E is measured, it is found that the MTF shows a value of greater than 80%. The MTF also represents contrast of a light amount of the exposure image E formed with the LED element 20. When the MTF shows a value of 100%, the exposure image E has the highest contrast of the light amount. When the MTF shows a lower value, it is indicated that the contrast of the light amount is lower and the exposure image E has a lower resolution.

The MTF is defined with the following equation:

MTF=(Imax−Imin)/(Imax+Imin)×100(%)

where Imax is a maximum value of the light amount of the exposure image E, and Imin is a minimum value of the light amount of the exposure image E.

When the MTF and the light amount are measured, a microscope digital camera is used for capturing the exposure image E of the LED element 20 situated at a location away from an end portion surface of the lens array 30 of the LED head 69 on the side of the image plane (the side of the photosensitive drum 65) by the image plane lens plane distance LI. Then, a light amount distribution of the exposure image E of the LED element 20 is analyzed from the image thus captured, thereby calculating the MTF and the light amount.

When the MTF is measured, the lens array 30 is mounted on the LED head 69, in which 600 of the LED elements 20 are arranged per one inch (1 inch=about 25.4 mm), and every other LED element 20 is lit alternately.

Figure 12:
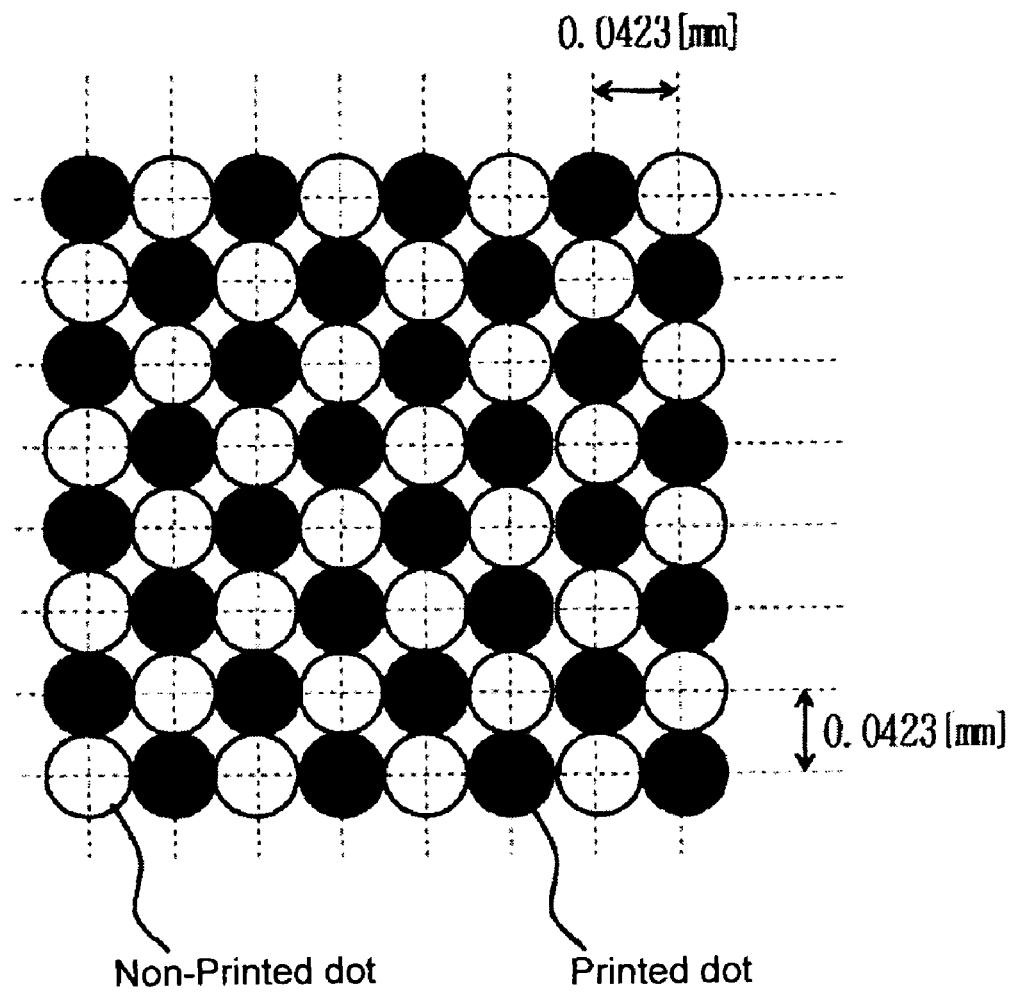
FIG. 12 is a schematic view showing an evaluation pattern.

An evaluation of the printer 60 with the LED head 69 will be explained next. FIG. 12 is a schematic view showing the evaluation pattern.

As shown in FIG. 12, the evaluation pattern includes print image pixels and non-print image pixels alternately arranged over an entire printable area. In the evaluation, the printer 60 prints the evaluation pattern shown in FIG. 12 at a resolution of 600 dpi, thereby evaluating image quality. According to the evaluation, the printer 10 is capable of forming an image with high quality without a streak or an uneven spot.

As described above, in the embodiment, the light transmission portions 33b are arranged such that a part of one light transmission portion 33b is overlapped with the adjacent light transmission portion 33b. Accordingly, it is possible to integrally provide the protrusions corresponding to the light transmission portions 33b in the metal mold for forming the aperture plate 33. As a result, it is possible to improve durability and productivity of the metal mold, and to easily produce the aperture plate 33.

Further, the light transmission portions 33b have the radius RA at one end portion thereof on the side of the LED elements 20 smaller than the radius RB at the other end portion thereof on the side of the photosensitive drum 65. Accordingly, when the aperture plate 33 is removed from the metal mold, it is possible to prevent the aperture plate 33 from being damaged, thereby improving a yield of the aperture plate 33.

Further, the aperture plate 33 blocks light incident on the adjacent micro lens 32, thereby increasing the value of the MTF in the lens array 30 and contrast of the light amount of the exposure image E. Further, it is possible to improve image quality without a streak or an uneven spot.

Second Embodiment

A second embodiment of the present invention will be explained next. Components in the second embodiment similar to those in the first embodiment are designated with the same reference numerals, and explanations thereof are omitted.

Figure 13:
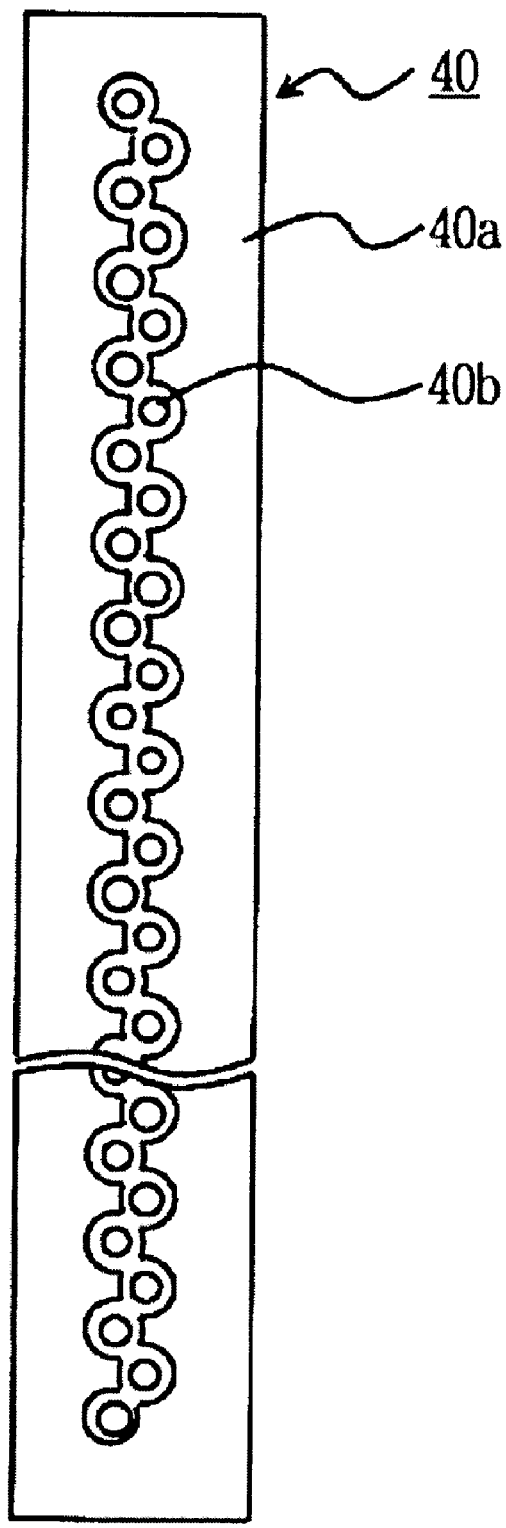
FIG. 13 is a schematic plan view showing an aperture plate according to a second embodiment of the present invention.
Figure 14:
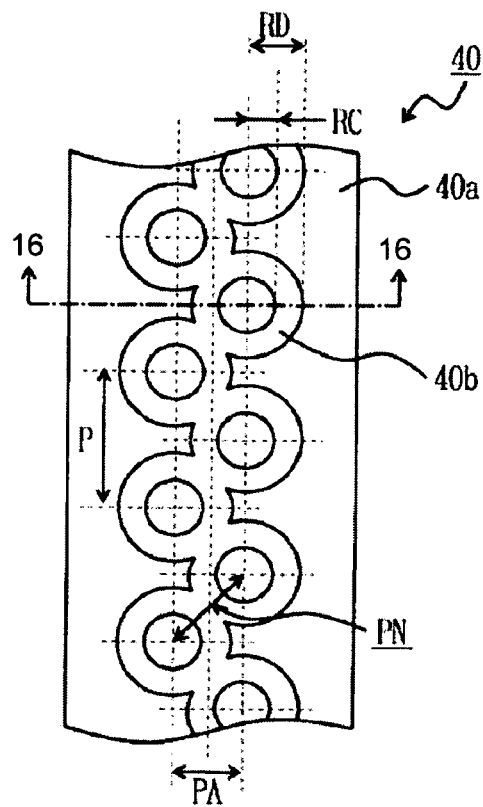
FIG. 14 is a schematic enlarged plan view showing the aperture plate according to the second embodiment of the present invention.
Figure 15:
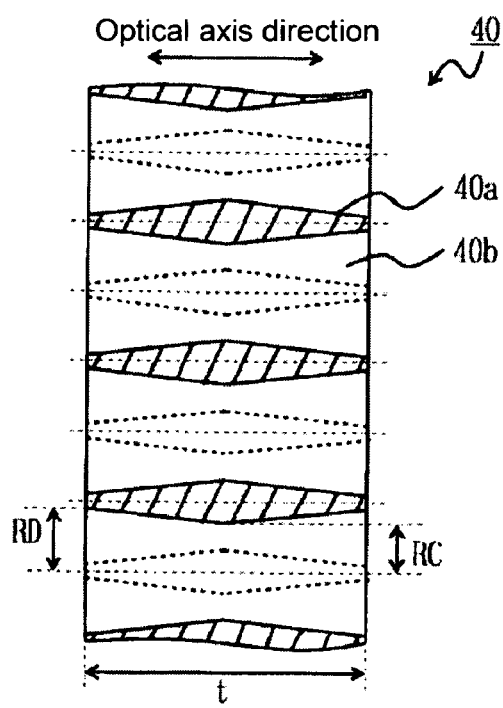
FIG. 15 is a schematic enlarged sectional view showing the aperture plate according to the second embodiment of the present invention.
Figure 16:
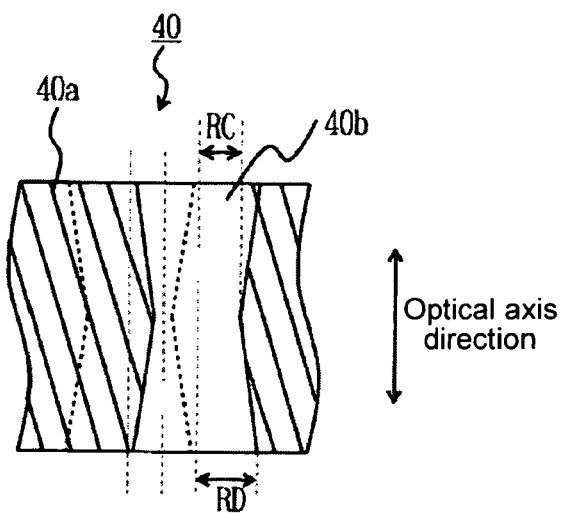
FIG. 16 is a schematic sectional view showing the aperture plate taken along a line 16-16 in FIG. 14 according to the second embodiment of the present invention.

FIG. 13 is a schematic plan view showing an aperture plate 40 according to the second embodiment of the present invention. FIG. 14 is a schematic enlarged plan view showing the aperture plate 40 according to the second embodiment of the present invention. FIG. 15 is a schematic enlarged sectional view showing the aperture plate 40 according to the second embodiment of the present invention. FIG. 16 is a schematic sectional view showing the aperture plate 40 taken along a line 16-16 in FIG. 14 according to the second embodiment of the present invention.

As shown in FIGS. 14 to 16, the aperture plate 40 as the light blocking member includes a light blocking portion 40a and light transmission portions 40b. As shown in FIG. 13, the light transmission portions 40b are arranged corresponding to the micro lenses 32 (refer top FIG. 4) in tow rows and a houndstooth check pattern. Further, the light transmission portions 40b are arranged such that a part of one light transmission portion 40b is overlapped with an adjacent light transmission portion 40b. The light blocking portion 40a is formed of a material blocking light incident from the LED elements 20 (refer to FIG. 3), and the light transmission portions 40b are formed of through holes.

In the embodiment, centers of the light transmission portions 40b in each row in the longitudinal direction of the aperture plate 40 are apart by a distance equal to the arrangement direction micro lens interval P. Centers of the light transmission portions 40b arranged adjacent to each other are apart by a distance equal to the adjacent micro lens interval PN. Centers of the light transmission portions 40b arranged in the width direction of the aperture plate 40 are apart by a distance equal to the lens row width direction between center distance PA.

As shown in FIG. 15, the light transmission portions 40b have a radius RC at a center portion thereof in the optical axis direction and a radius RD at end portions thereof in the optical axis direction. The radius RD is greater than the radius RC (RD>RC). In other words, the light transmission portions 40b have the center portions with a sectional area larger than that of the end portions thereof in the optical axis direction. In the embodiment, the radius RC is set to 0.3 mm, and the radius RD is set to 0.5 mm. Further, the aperture plate 40 has an aperture plate thickness t of 2.5 mm.

In the embodiment, the aperture plate 40 is formed of a resin such as polycarbonate through injection molding. A metal mold for forming the aperture plate 40 is divided into a first metal mold and a second metal mold, so that the first metal mold and the second metal mold are contact with each other near a center portion of the aperture plate 40 in the optical axis direction. When the aperture plate 40 is removed from the metal mold, the first metal mold and the second metal mold are separated. The first metal mold and the second metal mold are provided with protrusions for forming the light transmission portions 40b having a shape separable at the center portions thereof in the optical axis direction.

In the embodiment, the light transmission portions 40b have the radius RD at the end portions thereof larger than the radius RC at the center portion thereof in the optical axis direction. Further, the first metal mold and the second metal mold are separated at the center portion of the aperture plate 40 in the optical direction. Accordingly, when the aperture plate 40 is removed from the metal mold after injection molding, it is possible to reduce friction between surfaces of the light blocking portion 40a and surfaces of the protrusions. Accordingly, when the aperture plate 40 is removed from the metal mold, it is possible to prevent the aperture plate 40 from being damaged, thereby improving a yield of the aperture plate 40.

In the embodiment, with the LED head 69 as the exposure device, the MTF of the exposure image E is measured similar to that in the first embodiment. It is found that the value of the MTF is greater than 80%. Further, according to the evaluation of an image formed with the printer 60, it is confirmed that it is possible to improve image quality without a streak or an uneven spot.

As described above, in the embodiment, the light transmission portions 40b are arranged such that a part of one light transmission portion 40b is overlapped with the adjacent light transmission portion 40b. Accordingly, it is possible to integrally provide the protrusions corresponding to the light transmission portions 40b in the metal mold for forming the aperture plate 40. Further, each of the first metal mold and the second mold is provided with the protrusions, thereby reducing a length of the protrusions. As a result, it is possible to improve durability and productivity of the metal mold.

Further, the light transmission portions 40b have the radius RD at the end portions thereof larger than the radius RC at the center portion thereof in the optical axis direction. Further, the first metal mold and the second mold are separated at the center portion of the aperture plate 40 in the optical axis direction. Accordingly, when the aperture plate 40 is removed from the metal mold, it is possible to prevent the aperture plate 40 from being damaged, thereby improving a yield of the aperture plate 40.

In the embodiment, the adjacent light transmission portions 40b communicate with each other at the end portions of the light transmission portions 40b in the optical axis direction. Further, the adjacent light transmission portions 40b are separated from each other at the center portions of the light transmission portions 40b in the optical axis direction. Accordingly, the protrusions formed in the first metal mold and the second metal mold are integrated at base portions thereof, thereby improving durability and productivity of the metal mold.

Further, the aperture plate 40 blocks light incident on the adjacent micro lens 32, thereby increasing the value of the MTF in the lens array 30 and contrast of the light amount of the exposure image E. Further, it is possible to improve image quality without a streak or an uneven spot.

Third Embodiment

A third embodiment of the present invention will be explained next. Components in the third embodiment similar to those in the first and second embodiments are designated with the same reference numerals, and explanations thereof are omitted.

Figure 17:
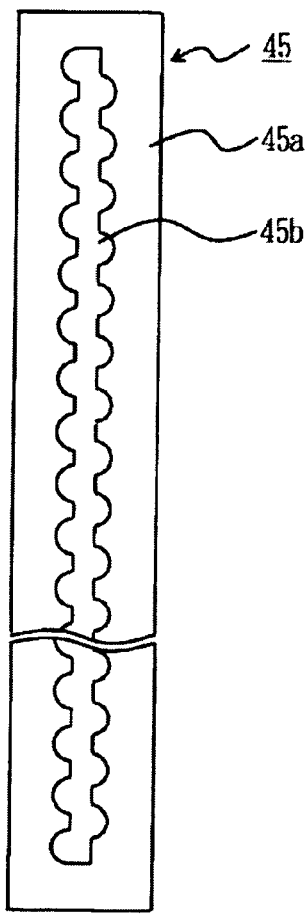
FIG. 17 is a schematic plan view showing an aperture plate according to a third embodiment of the present invention.
Figure 18:
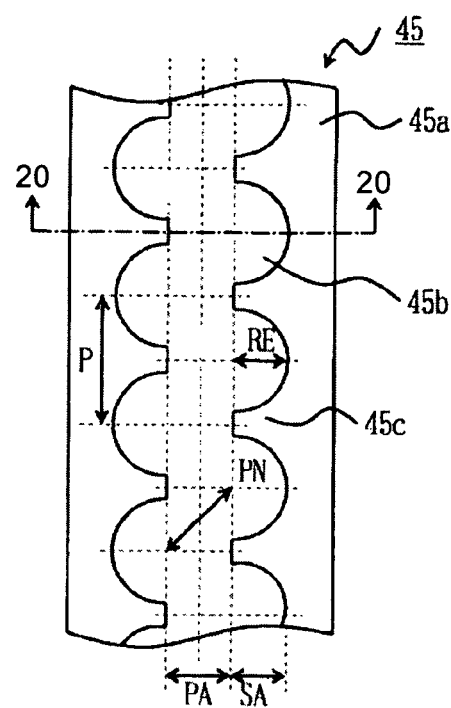
FIG. 18 is a schematic enlarged plan view showing the aperture plate according to the third embodiment of the present invention.
Figure 19:
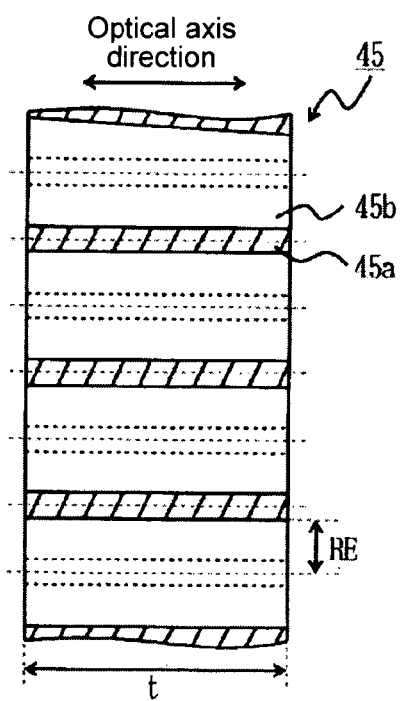
FIG. 19 is a schematic enlarged sectional view showing the aperture plate according to the third embodiment of the present invention.
Figure 20:
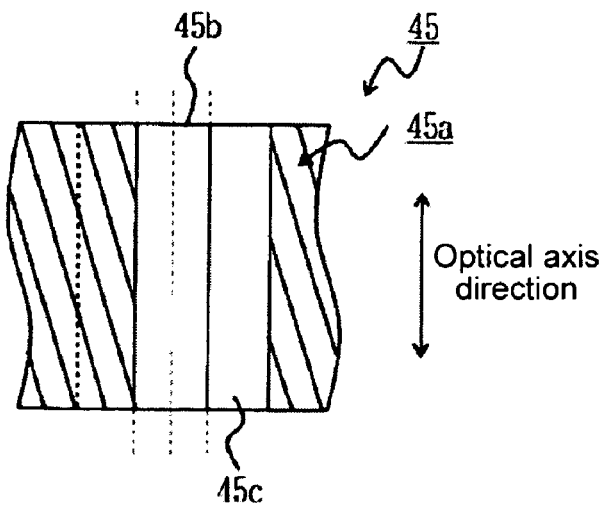
FIG. 20 is a schematic sectional view showing the aperture plate taken along a line 20-20 in FIG. 18 according to the third embodiment of the present invention.
Figure 21:
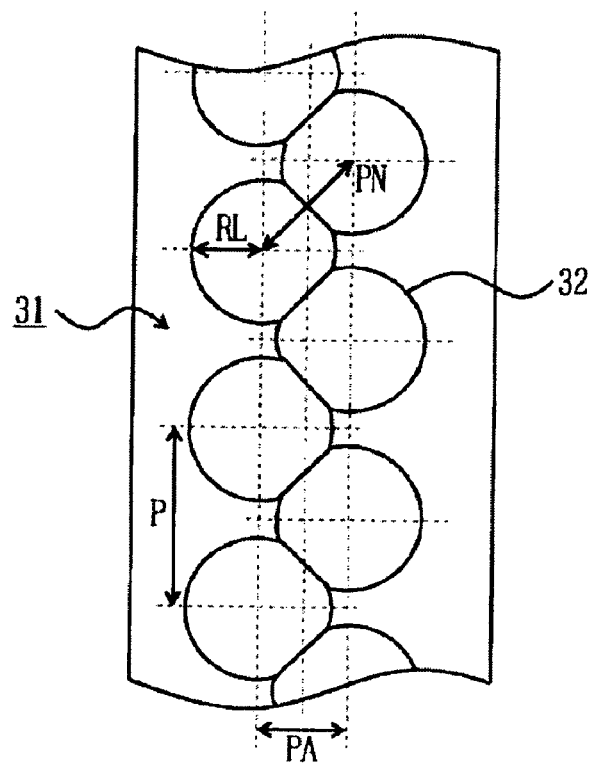
FIG. 21 is a schematic plan view showing a lens array according to the third embodiment of the present invention.
Figure 22:
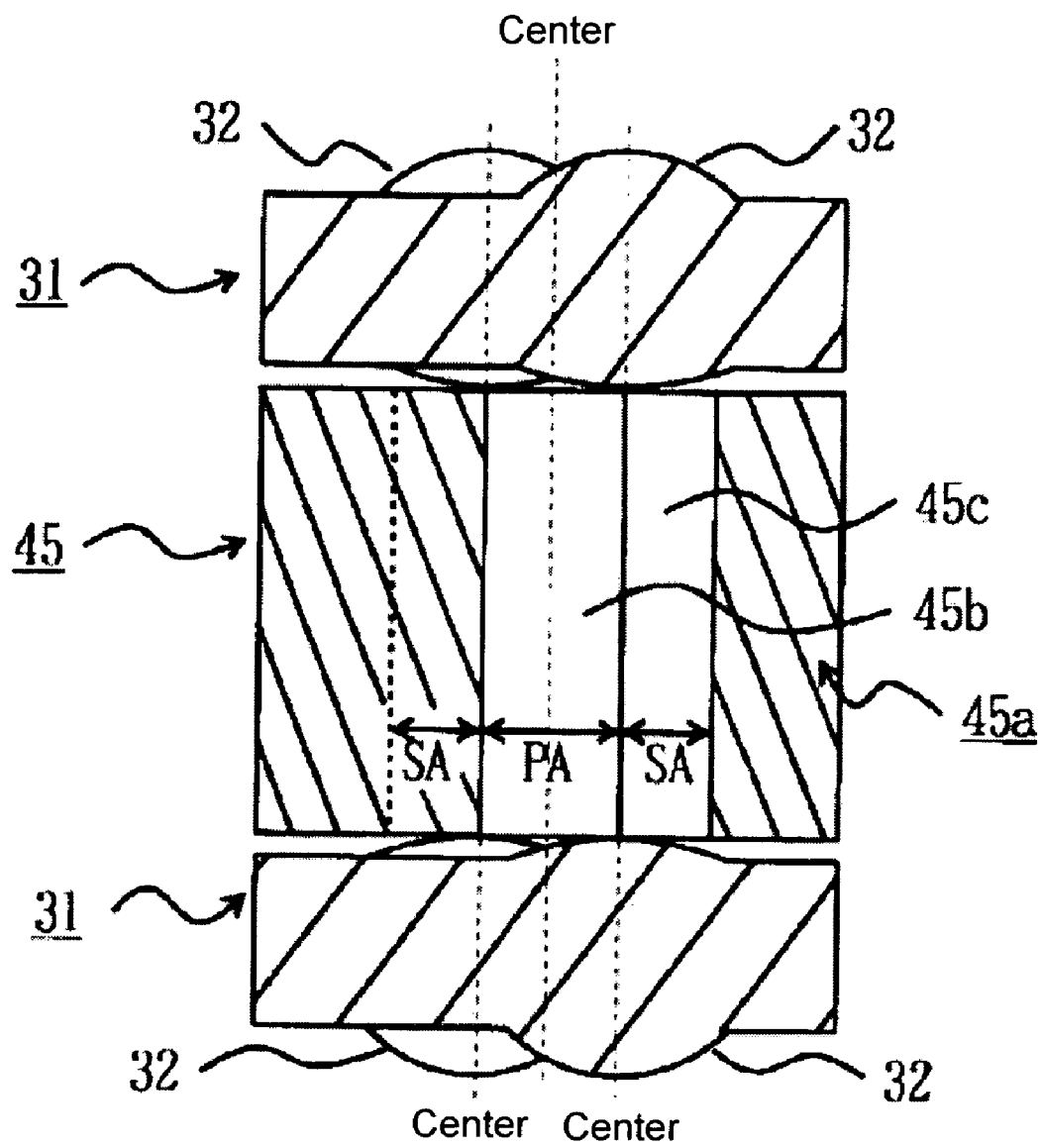
FIG. 22 is a schematic sectional view showing the lens array according to the third embodiment of the present invention.

FIG. 17 is a schematic plan view showing an aperture plate 45 according to the third embodiment of the present invention. FIG. 18 is a schematic enlarged plan view showing the aperture plate 45 according to the third embodiment of the present invention. FIG. 19 is a schematic enlarged sectional view showing the aperture plate 45 according to the third embodiment of the present invention. FIG. 20 is a schematic sectional view showing the aperture plate 45 taken along a line 20-20 in FIG. 18 according to the third embodiment of the present invention. FIG. 21 is a schematic plan view showing the lens array 30 according to the third embodiment of the present invention. FIG. 22 is a schematic sectional view showing the lens array 30 according to the third embodiment of the present invention.

As shown in FIGS. 17 to 20, the aperture plate 45 as the light blocking member includes a light blocking portion 45a and light transmission portions 45b. As shown in FIG. 17, the light transmission portions 45b are arranged corresponding to the micro lenses 32 (refer top FIG. 4) in tow rows and a houndstooth check pattern. Further, the light transmission portions 45b are arranged such that a part of one light transmission portion 45b is overlapped with an adjacent light transmission portion 45b. The light blocking portion 45a is formed of a material blocking light incident from the LED elements 20 (refer to FIG. 3), and the light transmission portions 45b are formed of through holes.

In the embodiment, centers of the light transmission portions 45b in each row in the longitudinal direction of the aperture plate 45 are apart by a distance equal to the arrangement direction micro lens interval P. Centers of the light transmission portions 45b arranged adjacent to each other are apart by a distance equal to the adjacent micro lens interval PN. Centers of the light transmission portions 45b arranged in the width direction of the aperture plate 45 are apart by a distance equal to the lens row width direction between center distance PA.

As shown in FIG. 18, near a boundary between two micro lenses 32 arranged next to each other, the light blocking portion 45a is provided for blocking an area from center positions of the two micro lenses 32 to end portions thereof in the width direction of the lens array 30. The light transmission portions 45b have an arc shape with a radius RE. The light blocking portion 45a has protruding portions 45c protruding toward the center of the lens array 30 in the width direction thereof (lens array width direction center) by an amount SA. The radius RE is equal to the amount SA (RE=SA). In the embodiment, the radius RE is set to 0.45 mm, and the aperture plate 45 has an aperture plate thickness t of 2.5 mm.

In the embodiment, the aperture plate 45 is formed of a resin such as polycarbonate though injection molding. With the LED head 69 as the exposure device, the MTF of the exposure image E is measured similar to that in the first embodiment. It is found that the value of the MTF is greater than 80%. Further, according to the evaluation of an image formed with the printer 60, it is confirmed that it is possible to improve image quality without a streak or an uneven spot.

As described above, in the embodiment, the light transmission portions 45b are arranged such that a part of one light transmission portion 45b is overlapped with the adjacent light transmission portion 45b. Accordingly, it is possible to integrally provide the protrusions corresponding to the light transmission portions 44b in the metal mold for forming the aperture plate 45.

Further, in the embodiment, the light transmission portions 45b have the arc shape with the radius RE equal to the amount SA of the protruding portions 45c. The protruding portions 45c do not protrude beyond the center of the micro lenses 32 in the width direction of the lens array 30. Accordingly, the light transmission portions 45b form a large through hole. As a result, it is possible to improve durability and productivity of the metal mold.

Further, the aperture plate 45 blocks light incident on the adjacent micro lens 32, thereby increasing the value of the MTF in the lens array 30 and contrast of the light amount of the exposure image E. Further, it is possible to improve image quality without a streak or an uneven spot.

Fourth Embodiment

A fourth embodiment of the present invention will be explained next. Components in the fourth embodiment similar to those in the first to third embodiments are designated with the same reference numerals, and explanations thereof are omitted.

Figure 23:
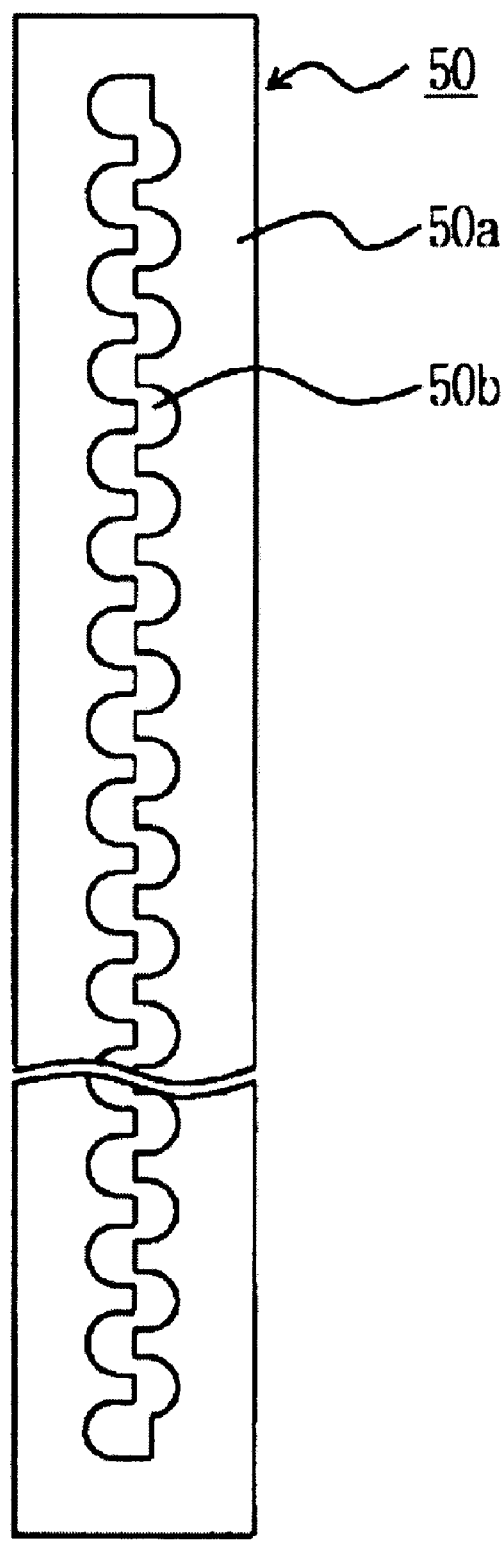
FIG. 23 is a schematic plan view showing an aperture plate according to a fourth embodiment of the present invention.
Figure 24:
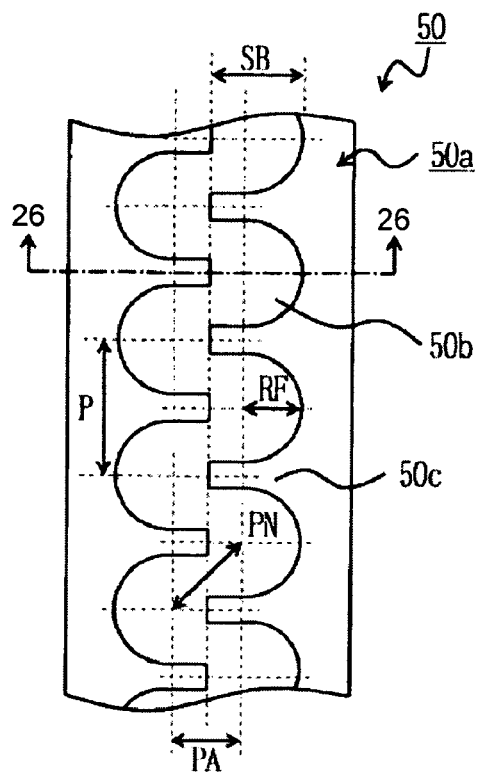
FIG. 24 is a schematic enlarged plan view showing the aperture plate according to the fourth embodiment of the present invention.
Figure 25:
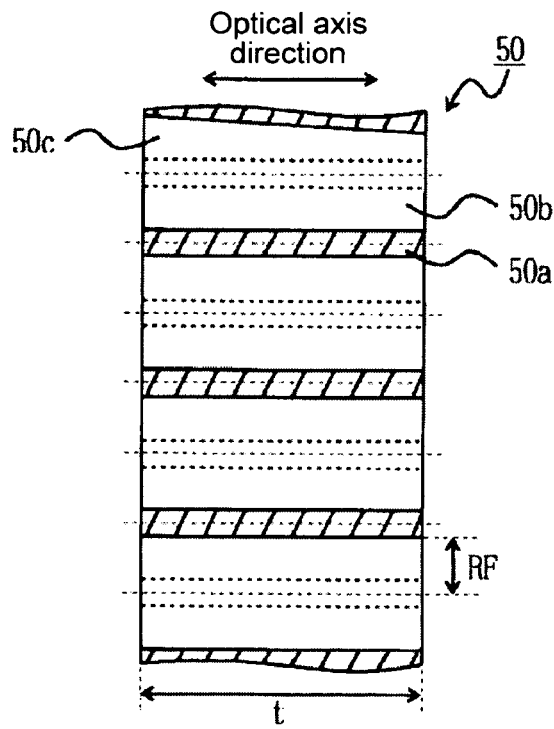
FIG. 25 is a schematic enlarged sectional view showing the aperture plate according to the fourth embodiment of the present invention.
Figure 26:
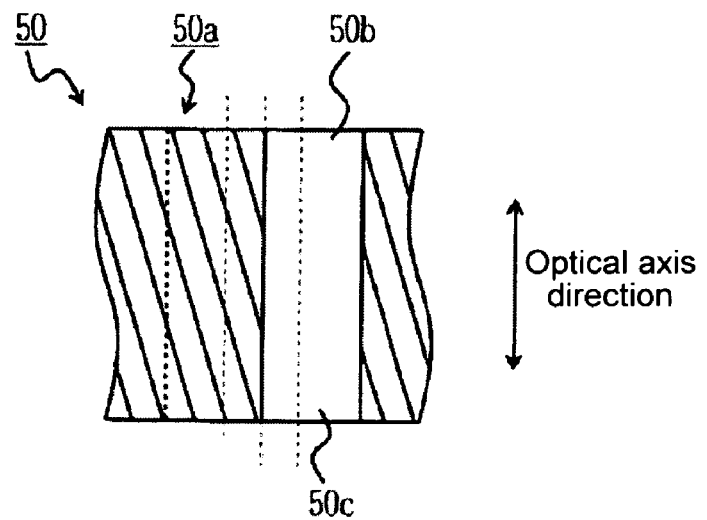
FIG. 26 is a schematic sectional view showing the aperture plate taken along a line 25-25 in FIG. 24 according to the fourth embodiment of the present invention.
Figure 27:
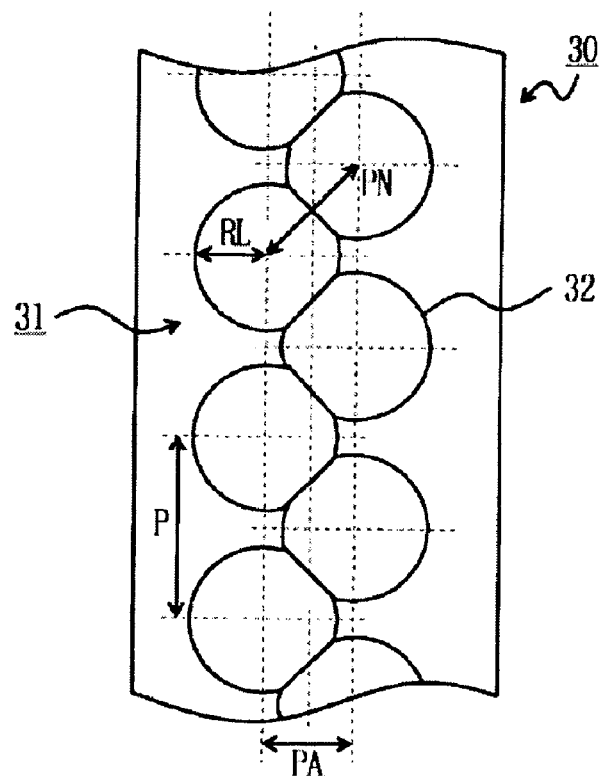
FIG. 27 is a schematic plan view showing a lens array according to the fourth embodiment of the present invention.
Figure 28:
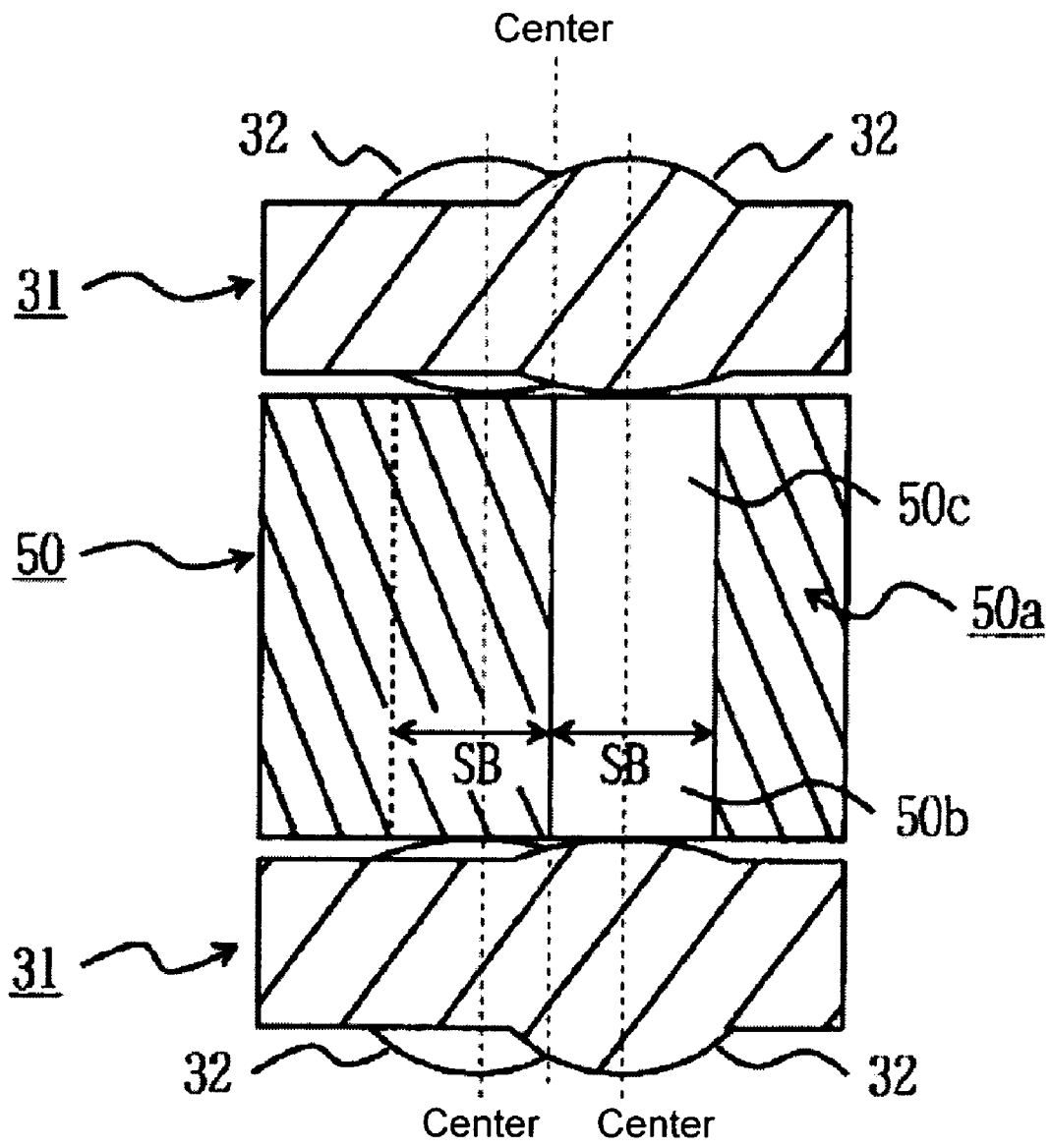
FIG. 28 is a schematic sectional view showing the lens array according to the fourth embodiment of the present invention.

FIG. 23 is a schematic plan view showing an aperture plate 50 according to the fourth embodiment of the present invention. FIG. 24 is a schematic enlarged plan view showing the aperture plate 50 according to the fourth embodiment of the present invention. FIG. 25 is a schematic enlarged sectional view showing the aperture plate 50 according to the fourth embodiment of the present invention. FIG. 26 is a schematic sectional view showing the aperture plate 50 taken along a line 25-25 in FIG. 24 according to the fourth embodiment of the present invention. FIG. 27 is a schematic plan view showing the lens array 30 according to the fourth embodiment of the present invention. FIG. 28 is a schematic sectional view showing the lens array 30 according to the fourth embodiment of the present invention.

As shown in FIGS. 23 to 26, the aperture plate 50 as the light blocking member includes a light blocking portion 50a and light transmission portions 50b. As shown in FIG. 23, the light transmission portions 50b are arranged corresponding to the micro lenses 32 (refer top FIG. 4) in tow rows and a houndstooth check pattern. Further, the light transmission portions 50b are arranged such that a part of one light transmission portion 50b is overlapped with an adjacent light transmission portion 50b. The light blocking portion 50a is formed of a material blocking light incident from the LED elements 20 (refer to FIG. 3), and the light transmission portions 50b are formed of through holes.

In the embodiment, centers of the light transmission portions 50b in each row in the longitudinal direction of the aperture plate 50 are apart by a distance equal to the arrangement direction micro lens interval P. Centers of the light transmission portions 50b arranged adjacent to each other are apart by a distance equal to the adjacent micro lens interval PN. Centers of the light transmission portions 50b arranged in the width direction of the aperture plate 50 are apart by a distance equal to the lens row width direction between center distance PA.

As shown in FIG. 24, near a boundary between two micro lenses 32 arranged next to each other, the light blocking portion 50a is provided for blocking an area from center positions of the two micro lenses 32 to end portions thereof in the width direction of the lens array 30. The light transmission portions 50b have an arc shape with a radius RF. The light blocking portion 45a has protruding portions 45c protruding toward the center of the lens array 30 in the width direction thereof (lens array width direction center) by an amount SB. The amount SB is equal to a sum of the radius RF and a half of the lens row width direction between center distance PA (SB=RF+PA/2). In the embodiment, the radius RF is set to 0.45 mm, and the aperture plate 45 has an aperture plate thickness t of 2.5 mm. Further, the lens row width direction between center distance PA is set to 0.400 mm, so that the amount SB becomes 0.65 mm.

In the embodiment, with the LED head 69 as the exposure device, the MTF of the exposure image E is measured similar to that in the first embodiment. It is found that the value of the MTF is greater than 90%.

As described above, in the embodiment, as compared with the first to third embodiments, the aperture plate 50 more securely blocks light incident on the adjacent micro lens 32, thereby increasing the value of the MTF in the lens array 30 and contrast of the light amount of the exposure image E. Further, it is possible to improve image quality without a streak or an uneven spot.

Fifth Embodiment

A fifth embodiment of the present invention will be explained next. Components in the fifth embodiment similar to those in the first to fourth embodiments are designated with the same reference numerals, and explanations thereof are omitted.

Figure 29:
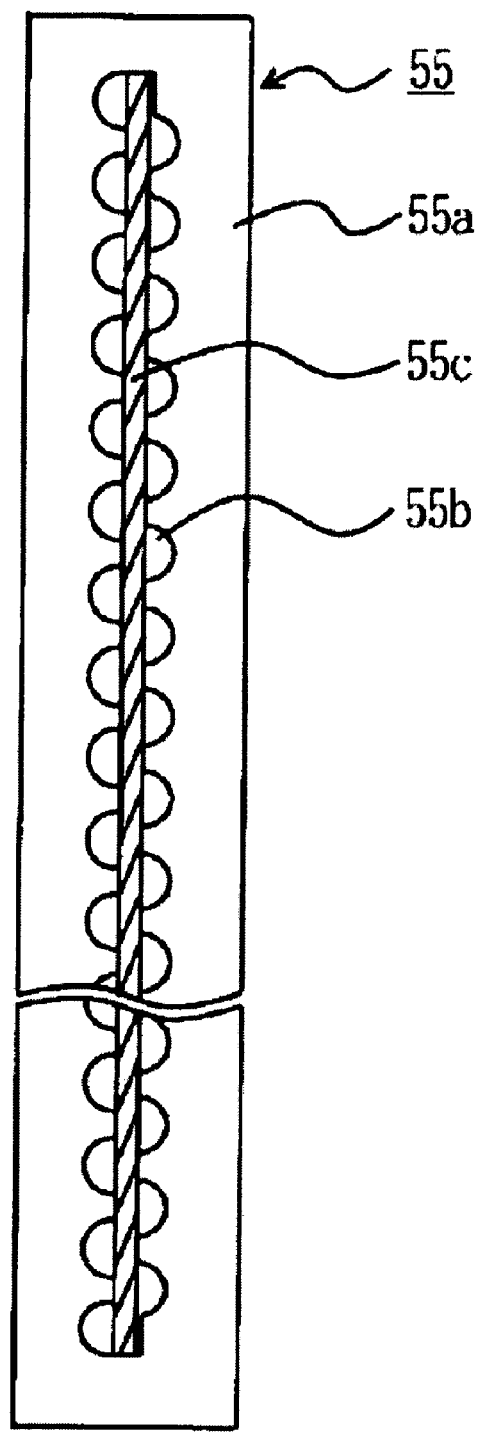
FIG. 29 is a schematic plan view showing an aperture plate according to a fifth embodiment of the present invention.
Figure 30:
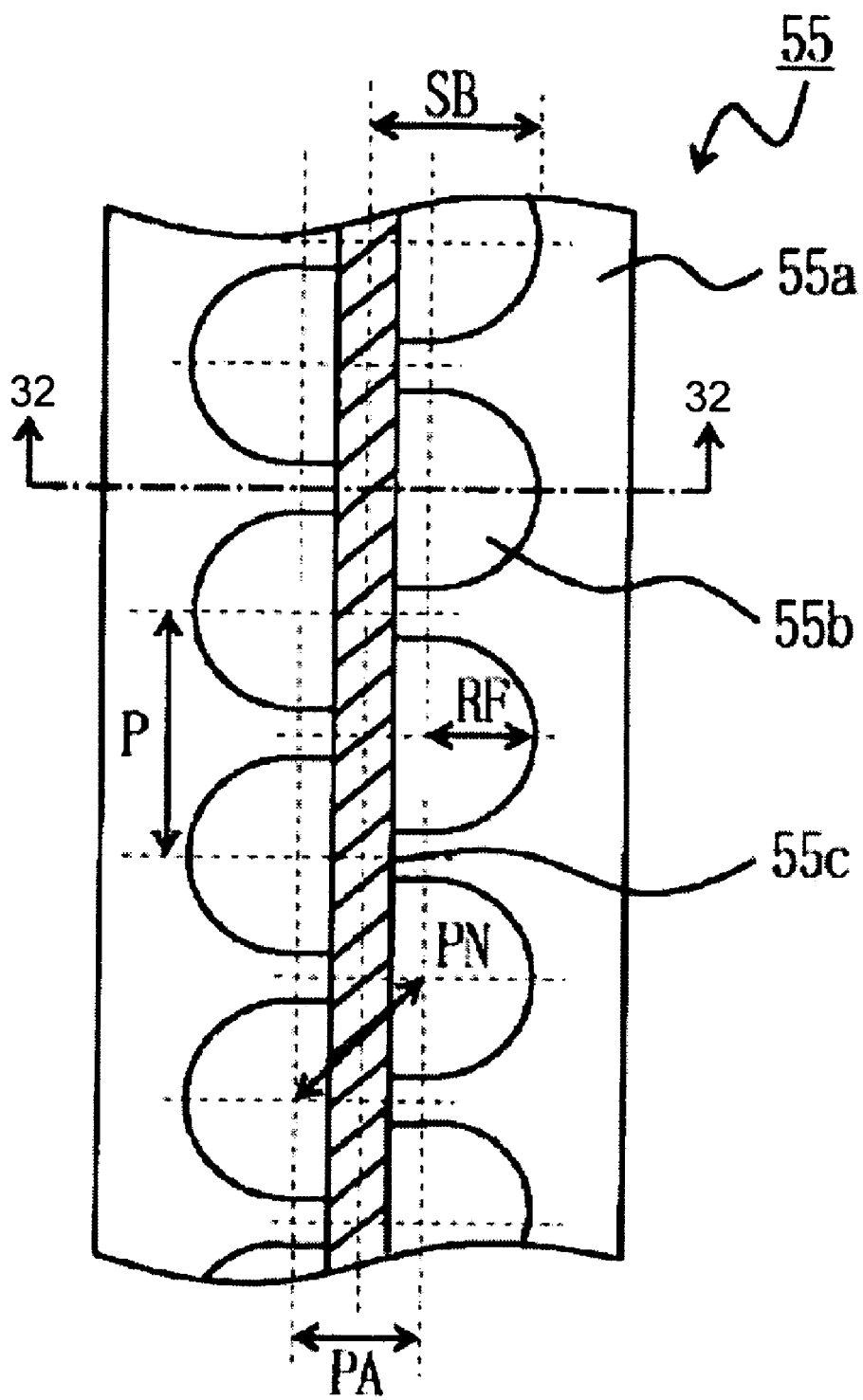
FIG. 30 is a schematic enlarged plan view showing the aperture plate according to the fifth embodiment of the present invention.
Figure 31:
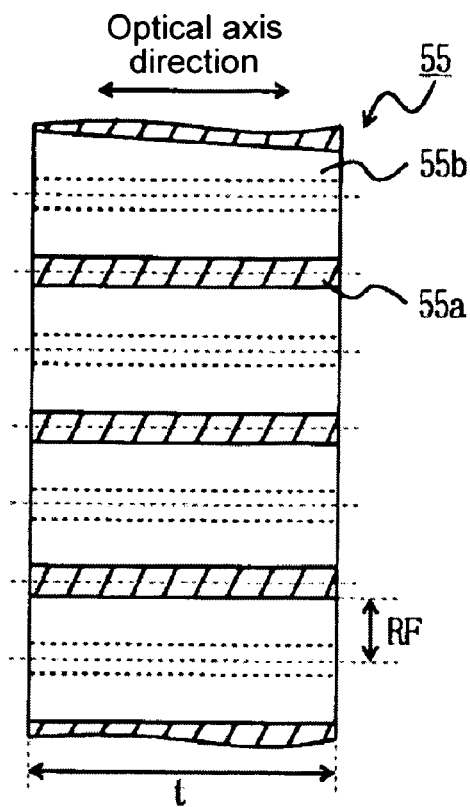
FIG. 31 is a schematic enlarged sectional view showing the aperture plate according to the fifth embodiment of the present invention.
Figure 32:
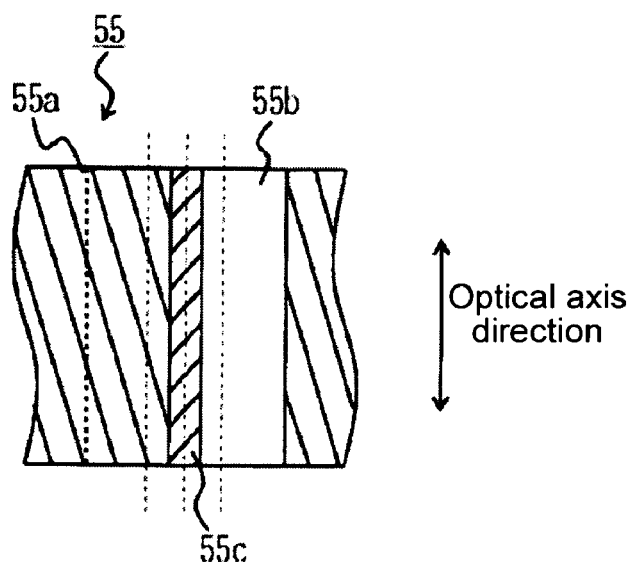
FIG. 32 is a schematic sectional view showing the aperture plate taken along a line 32-32 in FIG. 30 according to the fifth embodiment of the present invention.

FIG. 29 is a schematic plan view showing an aperture plate 55 according to the fifth embodiment of the present invention. FIG. 30 is a schematic enlarged plan view showing the aperture plate 55 according to the fifth embodiment of the present invention. FIG. 31 is a schematic enlarged sectional view showing the aperture plate 55 according to the fifth embodiment of the present invention. FIG. 32 is a schematic sectional view showing the aperture plate 55 taken along a line 32-32 in FIG. 30 according to the fifth embodiment of the present invention.

As shown in FIGS. 29 to 32, the aperture plate 55 as the light blocking member includes a light blocking portion 55a, light transmission portions 55b, and a section plate 55c as a section member disposed in the light blocking portion 55a and the light transmission portions 55b. As shown in FIG. 29, the light transmission portions 55b are arranged corresponding to the micro lenses 32 (refer top FIG. 4) in tow rows and a houndstooth check pattern. Further, the light transmission portions 55b are arranged such that a part of one light transmission portion 55b is overlapped with an adjacent light transmission portion 55b.

Sixth Embodiment

A sixth embodiment of the present invention will be explained next. In the sixth embodiment, the present invention is applied to a scanner as an image forming apparatus for reading an image on an original and generating electric data of the image or a reading apparatus. Components in the sixth embodiment similar to those in the first to fifth embodiments are designated with the same reference numerals, and explanations thereof are omitted.

Figure 33:
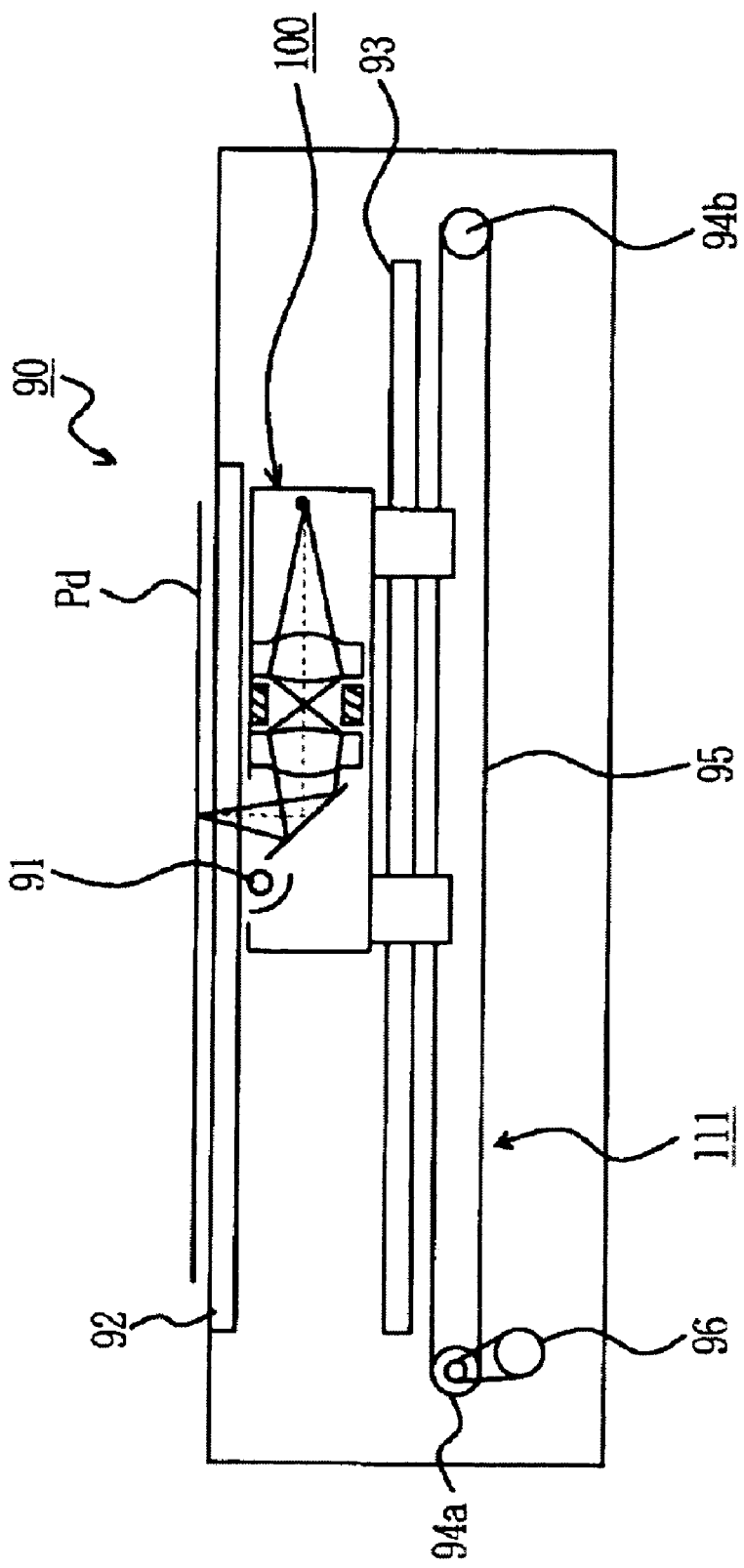
FIG. 33 is a schematic view showing a scanner according to a sixth embodiment of the present invention.
Figure 34:
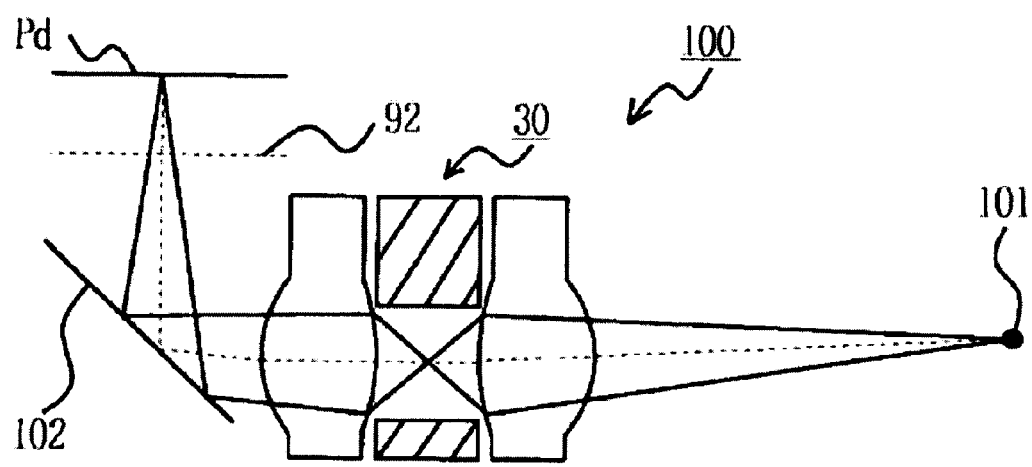
FIG. 34 is a schematic view showing a reading head of the scanner according to the sixth embodiment of the present invention.
Figure 35:
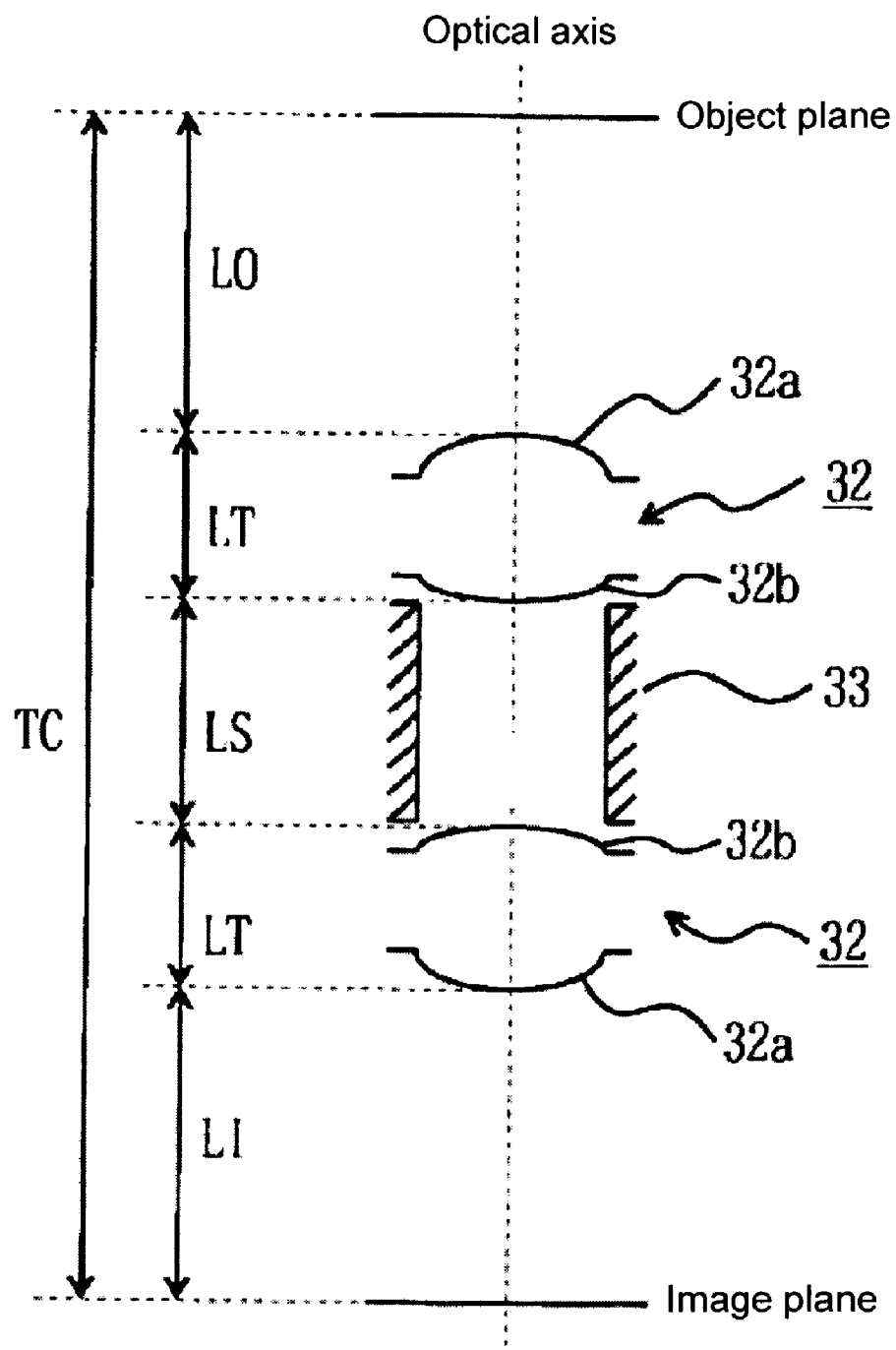
FIG. 35 is a schematic view showing a lens array in an arranged state according to the sixth embodiment of the present invention.

FIG. 33 is a schematic view showing a scanner 90 according to the sixth embodiment of the present invention. FIG. 34 is a schematic view showing a reading head 100 of the scanner 90 according to the sixth embodiment of the present invention. FIG. 35 is a schematic view showing the lens array 30 in an arranged state according to the sixth embodiment of the present invention.

As shown in FIG. 33, the scanner 90 includes a lamp 91 as a lighting device; an original table 92 formed of a material passing visible light; a rail 93; a line sensor 101; a mirror 102 for reflecting a path of light reflected at an original Pd; and a moving unit 111 for moving the reading head 100. The line sensor 101 has a resolution of 600 dpi, and includes 600 of light receiving elements arranged linearly per one inch with an interval of 0.0423 mm.

In the embodiment, the moving unit 111 includes a drive pulley 94a, a follower pulley 94b, a drive belt 95 extended between the drive pulley 94a and the follower pulley 94b, and a motor 96 as a drive unit for rotating the drive pulley 94a to move the drive belt 95. The reading head 100 is attached to the drive belt 95.

An operation of the reading head 100 will be explained next. When the motor 96 drives the drive belt 95 to move, the reading head 100 moves along the rail 93. The lamp 91 in the reading head 100 irradiates the original Pd placed on the original table 92. After light reflected on a surface of the original Pd passes through the original table 92, the mirror 102 bends the path of light, so that light is incident on the lens array 30. Accordingly, an image is formed on the line sensor 101 having an image plane. AS a result, the line sensor 101 generates an electrical signal corresponding to the image thus formed.

As described above, when the scanner 90 reads the original Pd, it is possible to obtain image data corresponding to the image of the original Pd. According to an evaluation of the image data, it is possible to read an image formed of dots (printed dots and non-printed dots) arranged alternately over an entire printable area of the original Pd at a resolution of 600 dpi. Accordingly, with the scanner 90, it is possible to obtain an image with high contrast, deep focal depth, and sufficient brightness.

In the embodiments, the printer 60 and the scanner 90 are explained as an example, and the present invention is not limited thereto. The present invention is applicable to an image forming apparatus such as a copier, or an image processing apparatus such as a reading device of a facsimile or a multi-function product. Further, the present invention is applicable to an input/output device, a biometric authentication device, a communication device, and a dimension measurement device using a sensor or a switch for converting an optical signal to an electrical signal.

The disclosure of Japanese Patent Application No. 2008-169276, filed on Jun. 27, 2008, is incorporated in the application by reference.

While the invention has been explained with reference to the specific embodiments of the invention, the explanation is illustrative and the invention is limited only by the appended claims.

What is claimed is:

1. A lens array comprising:
   a lens plate having a plurality of lenses arranged next to each other in a direction perpendicular to optical axes thereof; and
   a light blocking member for blocking light incident on the lenses, said light blocking member including a light blocking portion and a plurality of light passing portions arranged at positions corresponding to the lenses, said light passing portions communicating with each other.

2. The lens array according to claim 1, wherein said light blocking member includes a portion for blocking light over an area from a center of one of the lenses to an end portion of the one of the lenses in a width direction of the lens array near a boundary between two adjacent ones of the lenses.

3. The lens array according to claim 1, wherein said light blocking member includes a portion for blocking light over an area from a center of the lens array to an end portion of the lens array in a width direction of the lens array near a boundary between two adjacent ones of the lenses.

4. The lens array according to claim 1, wherein each of said lenses is arranged to form an upright same-size image so that the lens array forms an inverted reduced image.

5. The lens array according to claim 1, wherein said light blocking member is formed of a material through injection molding.

6. The lens array according to claim 1, wherein said light blocking member includes a light blocking pattern formed of a light blocking material, said light blocking pattern being formed in a member formed of a transparent material.

7. The lens array according to claim 1, wherein each of said light passing portions has one end portion having a sectional area smaller than that of the other end portion along an optical axis thereof.

8. The lens array according to claim 1, wherein each of said light passing portions has a center portion having a sectional area smaller than that of an end portion along an optical axis thereof.

9. An LED (Light Emitting Diode) print head comprising the lens array according to claim 1.

10. An image forming apparatus comprising the LED print head according to claim 9.

11. An exposure device comprising the lens array according to claim 1.

12. An image forming apparatus comprising the exposure device according to claim 11.

13. A reading apparatus comprising the lens array according to claim 1.

* * * * *